(12) United States Patent
Cloud et al.

(10) Patent No.: US 10,029,407 B2
(45) Date of Patent: Jul. 24, 2018

(54) APPARATUS, PROCESSES, AND SYSTEMS FOR HEAT SEALING

(71) Applicant: Big Heart Pet Brands, San Francisco, CA (US)

(72) Inventors: Michael D. Cloud, Meriden, KS (US); Nicholas E. Thornton, Hoyt, KS (US); Ronald L. Stanke, Port Charlotte, FL (US); Gary Chisholm, Clayton, CA (US)

(73) Assignee: Big Heart Pet, Inc., Orrville, OH (US)

(*) Notice: Subject to any disclaimer, the term of this patent is extended or adjusted under 35 U.S.C. 154(b) by 565 days.

(21) Appl. No.: 14/560,515

(22) Filed: Dec. 4, 2014

(65) Prior Publication Data

US 2016/0158999 A1    Jun. 9, 2016

(51) Int. Cl.
*B29C 65/10*      (2006.01)
*B29C 65/02*      (2006.01)
(Continued)

(52) U.S. Cl.
CPC ............ *B29C 65/02* (2013.01); *B29C 65/103* (2013.01); *B29C 65/48* (2013.01); *B29C 66/1122* (2013.01); *B29C 66/1352* (2013.01); *B29C 66/43* (2013.01); *B29C 66/4322* (2013.01); *B29C 66/49* (2013.01); *B29C 66/723* (2013.01); *B29C 66/73921* (2013.01); *B29C 66/8362* (2013.01); *B29C 66/83413* (2013.01); *B29C 65/4835* (2013.01); *B29C 65/5057* (2013.01); *B29C 66/71* (2013.01); *B29C 66/729* (2013.01); *B29C 66/7234* (2013.01);
(Continued)

(58) Field of Classification Search
None
See application file for complete search history.

(56) References Cited

U.S. PATENT DOCUMENTS 2,281,582 A    5/1942    Irmscher
2,392,695 A    1/1946    Rohdin
(Continued)

FOREIGN PATENT DOCUMENTS

CA    2240265    2/1999
DE    970084     8/1958
(Continued)

*Primary Examiner* — Barbara J Musser
(74) *Attorney, Agent, or Firm* — Michael A. Olshavsky

(57) ABSTRACT

Nozzle is provided for heat sealing, as well as methods of use thereof. Nozzle includes blade with leading edge and trailing edge having an opening for air to exit. Opening communicates with hot air tool through internal channel of blade and bore of attachment for nozzle. Blade may be bent to improve interposition of blade between material(s) to be seamed or sealed. Linear edges, curvilinear edges, stepped edges, or any combination thereof, define air exit opening. Nozzle directs hot air downstream from nozzle and perpendicular to nozzle's trailing edge. With blade interposed between material(s), hot air is directed parallel to direction of flow of material(s) in process flow. Hot air heats material(s) to a fusion temperature, or a thermoset to its activation temperature, provided along a forming region of seal or seam. Compressive force applied to material downstream from nozzle assists contact of melted material to form seal or seam.

29 Claims, 17 Drawing Sheets

(51) Int. Cl.
  B29C 65/48 (2006.01)
  B29C 65/00 (2006.01)
  B29L 31/00 (2006.01)
  B29C 65/50 (2006.01)
(52) U.S. Cl.
  CPC . *B29C 66/72328* (2013.01); *B29L 2031/7128* (2013.01); *B29L 2031/7148* (2013.01)

(56) References Cited

U.S. PATENT DOCUMENTS

| | | |
|---|---|---|
| 2,626,495 A | 1/1953 | Gaubert |
| 2,633,432 A | 3/1953 | Kenneway, Jr. |
| 3,190,049 A | 6/1965 | Van Der Meulen |
| 3,286,433 A | 11/1966 | Johnson et al. |
| 3,380,646 A | 4/1968 | Doyen et al. |
| 3,381,448 A | 5/1968 | Ayres et al. |
| 3,562,920 A | 2/1971 | Vuilleumier et al. |
| 3,606,727 A | 9/1971 | Davis |
| 3,675,396 A | 7/1972 | Hawryluk et al. |
| 3,715,855 A | 2/1973 | Armstrong |
| 3,730,804 A | 5/1973 | Dickey |
| 3,785,547 A | 1/1974 | De Vries |
| 3,879,917 A | 4/1975 | Bassendale et al. |
| 3,889,449 A | 6/1975 | Membrino |
| 3,929,227 A | 12/1975 | Burdis |
| 3,930,041 A | 12/1975 | Komatsu et al. |
| 3,935,993 A | 2/1976 | Doyen et al. |
| 3,954,258 A | 5/1976 | Skipor et al. |
| 3,980,515 A | 9/1976 | Reil et al. |
| 3,998,135 A | 12/1976 | Sargent |
| 4,070,853 A | 1/1978 | Sanders |
| 4,088,264 A | 5/1978 | Vogt |
| 4,115,978 A | 9/1978 | Langemeyer et al. |
| 4,146,133 A | 3/1979 | Bogorad et al. |
| 4,191,004 A | 3/1980 | Gmuer et al. |
| 4,235,064 A | 11/1980 | Wenger |
| 4,317,980 A | 3/1982 | Goodrich et al. |
| 4,341,054 A | 7/1982 | Courthèoux |
| 4,353,198 A | 10/1982 | Koppe |
| 4,360,996 A | 11/1982 | Rutter |
| 4,370,845 A | 2/1983 | Perolls et al. |
| 4,376,670 A | 3/1983 | Rodish |
| 4,510,736 A | 4/1985 | Müller |
| 4,512,138 A | 4/1985 | Greenawalt |
| 4,529,472 A | 7/1985 | Hsu |
| 4,534,154 A | 8/1985 | Gaubert |
| 4,537,016 A | 8/1985 | Shanklin et al. |
| 4,549,387 A | 10/1985 | Marshall et al. |
| 4,578,924 A | 4/1986 | De Crane |
| 4,603,537 A | 8/1986 | Pace |
| 4,676,051 A | 6/1987 | Hoskinson et al. |
| 4,712,360 A | 12/1987 | Bertoglio |
| 4,737,213 A | 4/1988 | Paeglis et al. |
| 4,805,381 A | 2/1989 | Hannon |
| 4,856,260 A | 8/1989 | Woo et al. |
| 4,926,613 A | 5/1990 | Hansen |
| 4,931,034 A | 6/1990 | Wagner |
| 4,965,985 A | 10/1990 | Masubuchi et al. |
| 4,989,391 A | 2/1991 | Wetter |
| 4,999,974 A | 3/1991 | Kovacs et al. |
| 5,177,939 A | 1/1993 | Lipes |
| 5,184,447 A | 2/1993 | Johnsen |
| 5,281,027 A | 1/1994 | Thrall |
| 5,441,345 A | 8/1995 | Garvey et al. |
| 5,493,844 A | 2/1996 | Combrink |
| 5,669,201 A | 9/1997 | Simionato |
| 5,687,545 A | 11/1997 | Baker |
| 5,738,712 A | 4/1998 | Hyppanen et al. |
| 5,771,667 A | 6/1998 | McGregor et al. |
| 5,845,995 A | 12/1998 | Starlinger Huemer |
| 5,918,441 A | 7/1999 | Baker |
| 5,964,074 A | 10/1999 | Suzuki et al. |
| 6,058,681 A | 5/2000 | Recchia, Jr. |
| 6,065,217 A | 5/2000 | Dong |
| 6,134,387 A | 10/2000 | Toss |
| 6,145,273 A | 11/2000 | Baker |
| 6,170,238 B1 | 1/2001 | Lerner |
| 6,187,122 B1* | 2/2001 | Hubbard ............ B29C 66/1122 156/497 |
| 6,312,472 B1 | 11/2001 | Hall et al. |
| 6,315,448 B1 | 11/2001 | Thrall |
| 6,344,228 B1 | 2/2002 | Rubio et al. |
| 6,355,287 B2 | 3/2002 | Noel et al. |
| 6,374,579 B1 | 4/2002 | Muller |
| 6,460,317 B1 | 10/2002 | Voss |
| 6,478,465 B1 | 11/2002 | Thrall |
| 6,533,457 B1 | 3/2003 | Schwenke et al. |
| 6,655,114 B2 | 12/2003 | Hiramoto et al. |
| 6,659,645 B1 | 12/2003 | Schulz |
| 6,862,867 B2 | 3/2005 | Cady et al. |
| 6,883,294 B2 | 4/2005 | Reist |
| 6,928,794 B2 | 8/2005 | Hamer et al. |
| 6,957,915 B2 | 10/2005 | Tankersley |
| 7,065,937 B2 | 6/2006 | Tankersley |
| 7,166,344 B2 | 1/2007 | Dean |
| 7,285,749 B2 | 10/2007 | Woods et al. |
| 7,819,583 B2 | 10/2010 | Walker et al. |
| 7,891,159 B2 | 2/2011 | Iocco et al. |
| 7,937,908 B2 | 5/2011 | Anzini et al. |
| 8,211,262 B2 | 7/2012 | Henry et al. |
| 8,240,915 B2 | 8/2012 | Sargin et al. |
| 8,297,840 B2 | 10/2012 | Jansen |
| 8,371,448 B1 | 2/2013 | Reaux |
| 8,443,578 B2 | 5/2013 | Sargin et al. |
| 8,646,974 B2 | 2/2014 | Dalgleish et al. |
| 2002/0124526 A1 | 9/2002 | Lewis, Jr. et al. |
| 2002/0168120 A1 | 11/2002 | Wessling et al. |
| 2004/0006950 A1 | 1/2004 | Knoerzer et al. |
| 2004/0136622 A1 | 7/2004 | Shigeta et al. |
| 2004/0142805 A9 | 7/2004 | Post et al. |
| 2006/0110081 A1 | 5/2006 | Chapougnot et al. |
| 2006/0280914 A1 | 12/2006 | Jostler et al. |
| 2007/0127855 A1 | 6/2007 | Smith et al. |
| 2007/0140599 A1 | 6/2007 | Dalgleish et al. |
| 2007/0232473 A1 | 10/2007 | Hartman et al. |
| 2007/0289261 A1 | 12/2007 | Rogers |
| 2008/0300122 A1 | 12/2008 | Sauder et al. |
| 2009/0056278 A1 | 3/2009 | Anzini et al. |
| 2009/0197750 A1 | 8/2009 | Beckmann et al. |
| 2009/0263048 A1 | 10/2009 | Iannelli, II et al. |
| 2009/0320729 A1 | 12/2009 | Henry et al. |
| 2010/0154362 A1 | 6/2010 | Jansen |
| 2010/0192520 A1 | 8/2010 | Jansen |
| 2010/0209022 A1 | 8/2010 | Gilmore et al. |
| 2011/0019944 A1 | 1/2011 | Sargin |
| 2011/0083803 A1 | 4/2011 | Henry |
| 2011/0083811 A1 | 4/2011 | Henry et al. |
| 2011/0103721 A1 | 5/2011 | Sargin et al. |
| 2011/0150368 A1 | 6/2011 | Ellsworth et al. |
| 2011/0186463 A1 | 8/2011 | Kommisrud |
| 2011/0263400 A1 | 10/2011 | Sargin |
| 2012/0070103 A1 | 3/2012 | Sargin |
| 2012/0096815 A1 | 4/2012 | Vollenkemper |
| 2012/0110956 A1 | 5/2012 | Miller |
| 2012/0196731 A1 | 8/2012 | Sargin |
| 2012/0210678 A1 | 8/2012 | Alcouloumre et al. |
| 2012/0211387 A1 | 8/2012 | Roland et al. |
| 2012/0225762 A1 | 9/2012 | Sargin et al. |
| 2012/0227363 A1 | 9/2012 | Nussbaum |
| 2012/0291402 A1 | 11/2012 | Jansen |
| 2012/0312478 A1 | 12/2012 | Sargin et al. |
| 2013/0031875 A1 | 2/2013 | Sargin |

FOREIGN PATENT DOCUMENTS

| | | |
|---|---|---|
| DE | 3514714 A1 | 10/1986 |
| DE | 8807293 | 9/1988 |
| DE | 3819040 C2 | 12/1989 |
| DE | 20206497 U1 | 9/2002 |
| DE | 10200804 A1 | 7/2003 |
| DE | 10218273 C1 | 9/2003 |
| DE | 10346881 A1 | 5/2005 |
| EP | 0377416 B1 | 7/1993 |

(56) References Cited

FOREIGN PATENT DOCUMENTS

| | | |
|---|---|---|
| EP | 1201539 B1 | 10/2000 |
| EP | 1663835 B1 | 12/2008 |
| FR | 2471919 | 6/1981 |
| FR | 2614270 A1 | 4/1988 |
| GB | 797745 | 7/1958 |
| GB | 825263 | 12/1959 |
| GB | 886672 | 1/1962 |
| GB | 888623 | 1/1962 |
| GB | 1302450 | 1/1973 |
| GB | 1308786 | 3/1973 |
| GB | 1356792 | 6/1974 |
| GB | 1377149 | 12/1974 |
| GB | 1509708 | 5/1978 |
| GB | 2056907 B | 3/1981 |
| GB | 2067462 A | 7/1981 |
| JP | 200644704 | 2/2006 |
| JP | 2006315713 | 11/2006 |
| KR | 20010069849 | 7/2001 |
| WO | WO198401351 | 4/1984 |
| WO | WO2011072801 A3 | 6/2011 |
| WO | WO2012050463 A1 | 4/2012 |
| WO | 2013124305 | 8/2013 |

\* cited by examiner

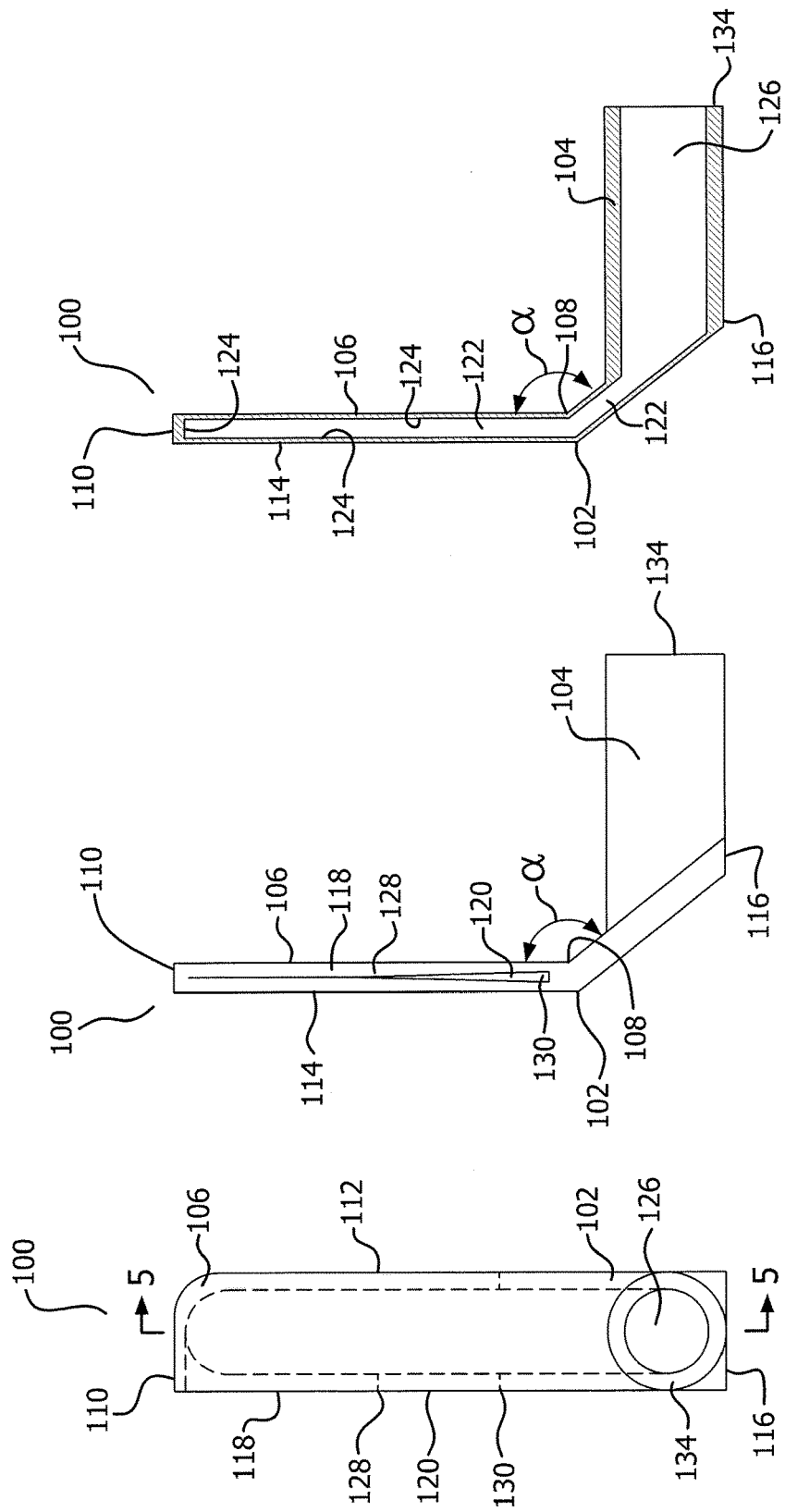

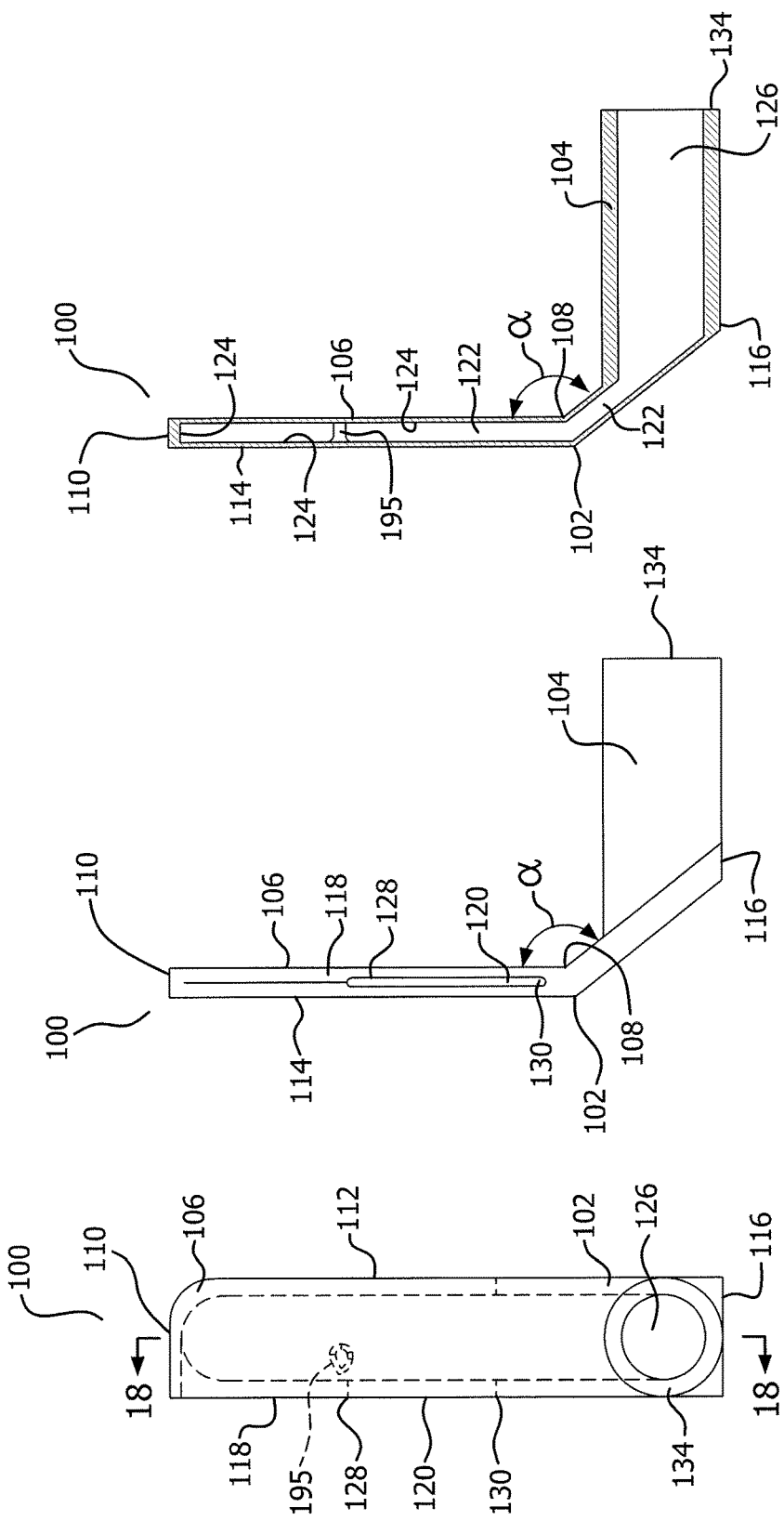

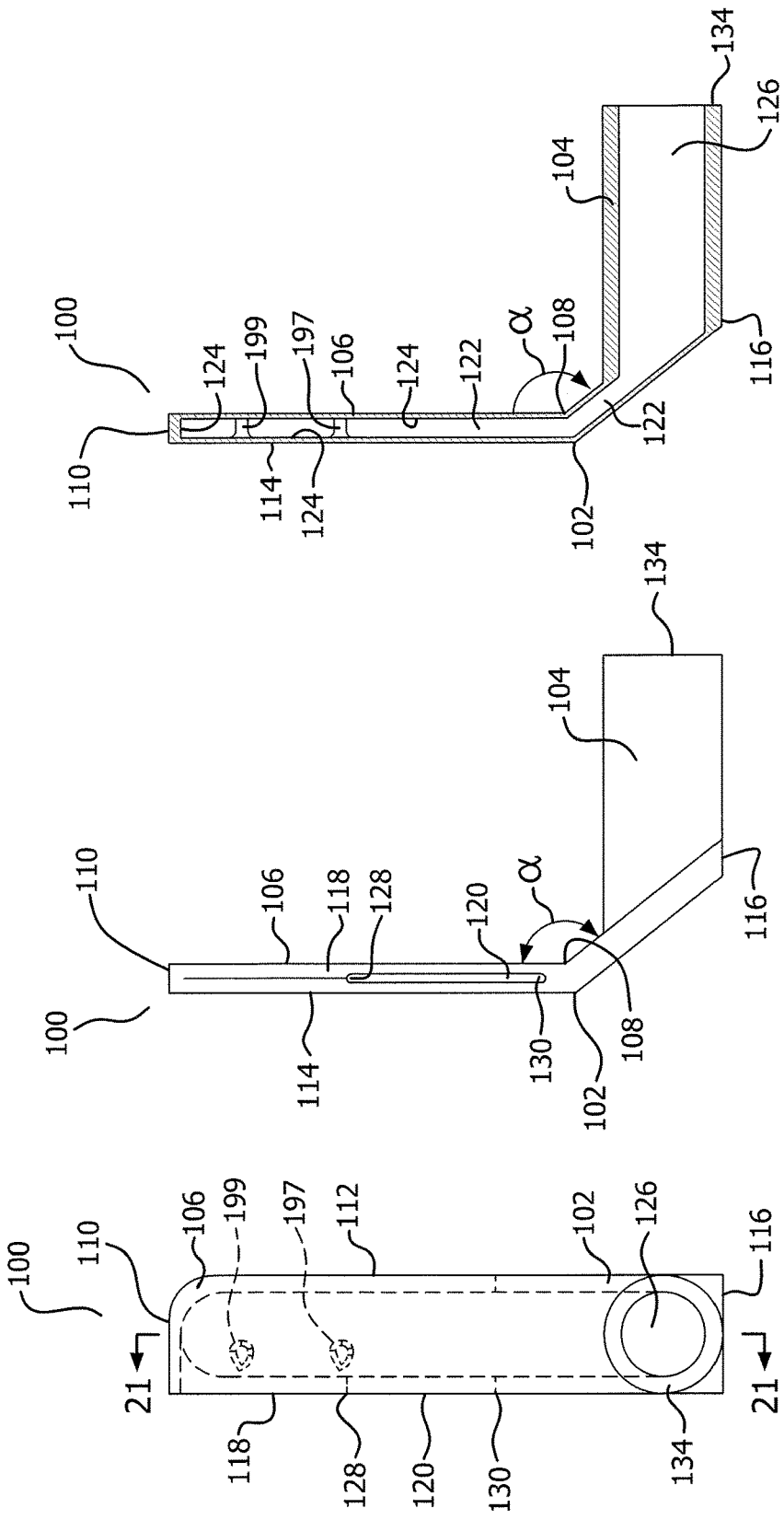

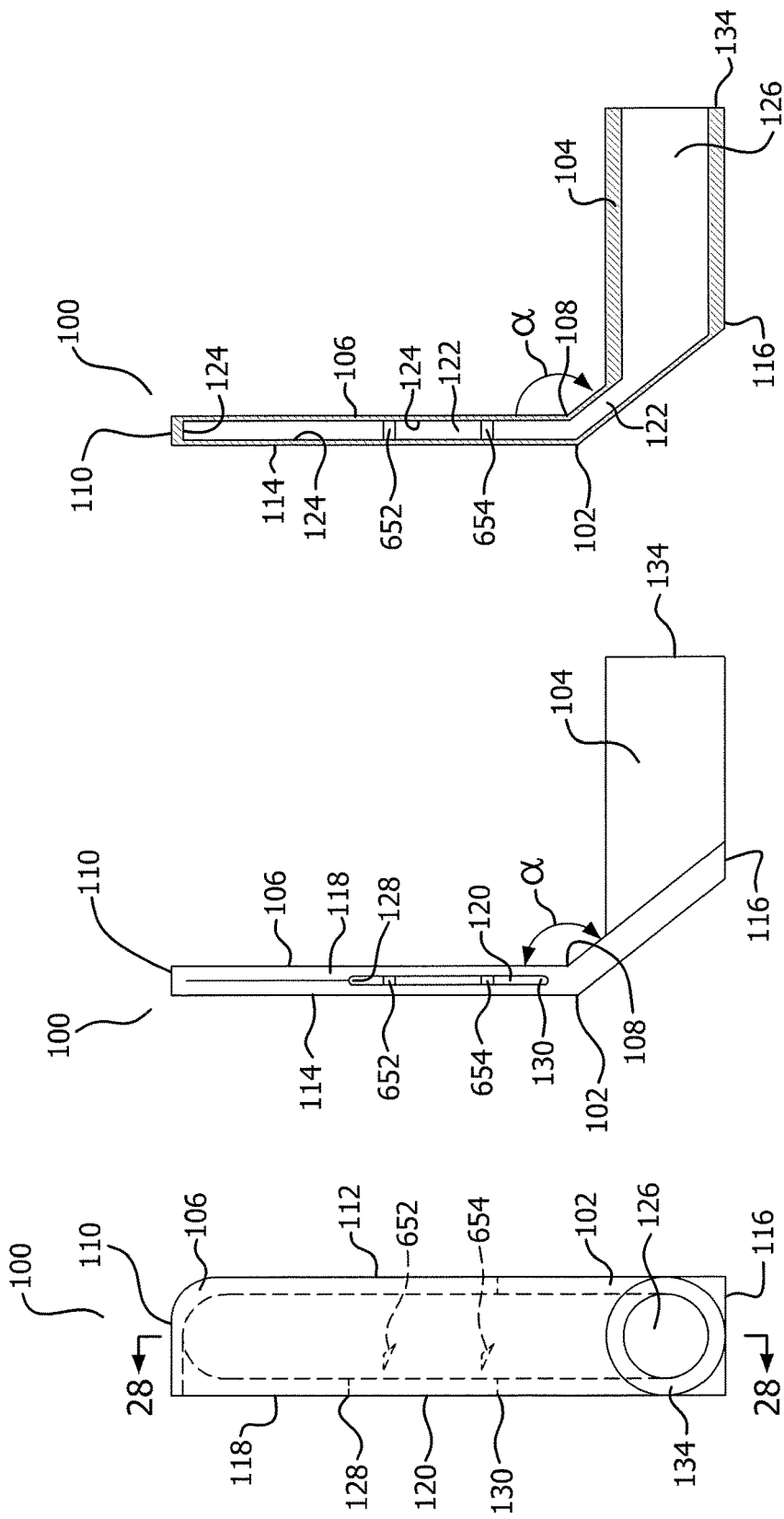

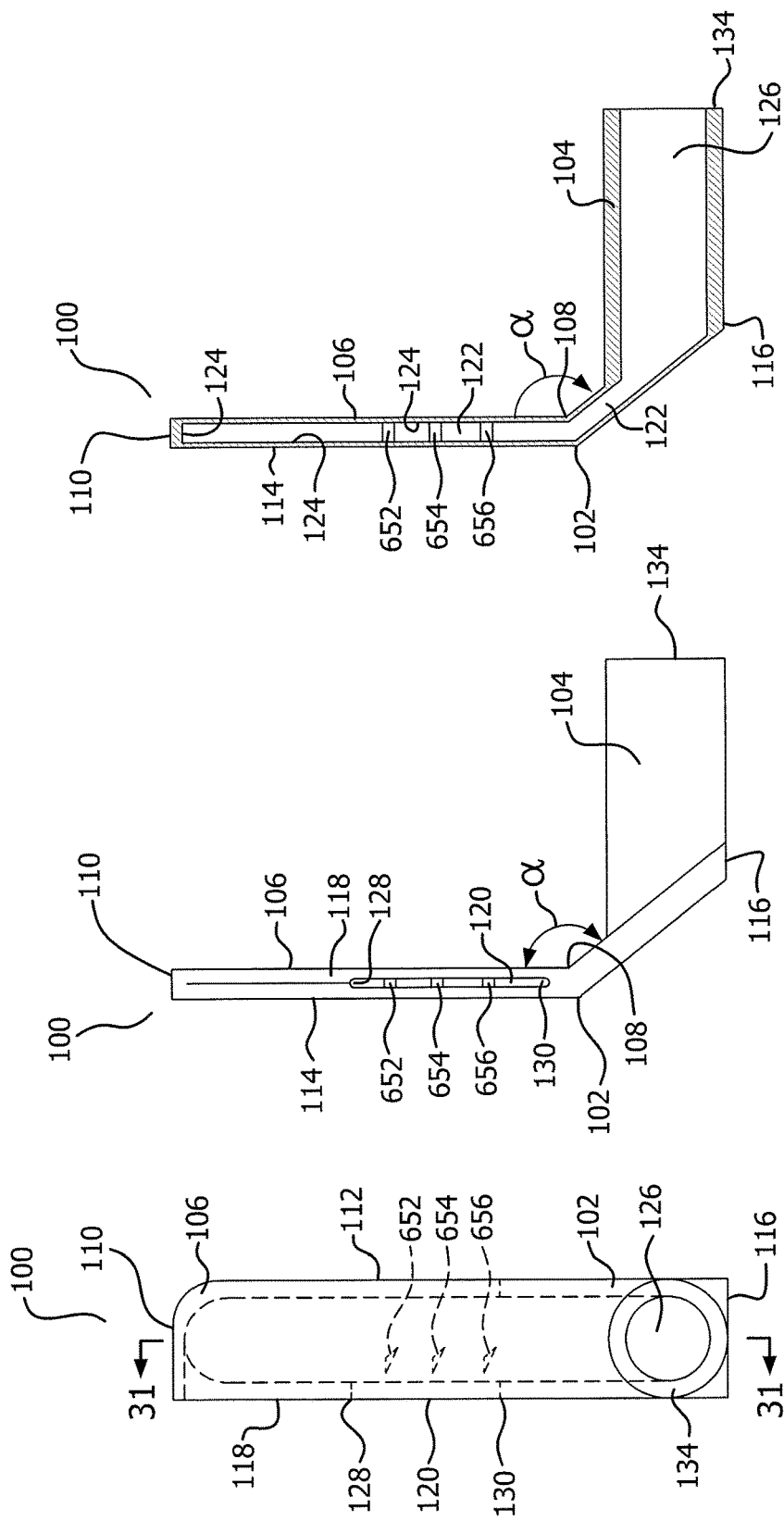

APPARATUS, PROCESSES, AND SYSTEMS FOR HEAT SEALING

FIELD OF INVENTION

The invention relates to apparatus, processes and systems useful for sealing or seaming thermoplastic, elastomeric, paper or other material. More specifically, the invention relates to a hot air nozzle, as well as processes and systems that implement the hot air nozzle for heat sealing.

BACKGROUND OF THE INVENTION

Numerous types of apparatus and processes that use heat to seal and/or seam thermoplastic, elastomeric, paper, and other materials are known in the art. For example, heat sealing is one such process that is used to weld material to itself along a seam or seal, or to join pieces of material together into larger pieces, such as, for example, tarps, tarpaulins, signs, tents, and inflatables. This process involves applying heat along a path on a surface(s) of a material to sufficiently melt a portion of the surface(s) along the path where a seal or seam is to be formed with the material, contacting the melted portion of the surface with either a corresponding melted surface or non-melted surface of the material, and then applying pressure along the heated surface of the material to facilitate seam or seal formation when the melted portion of the material solidifies.

One common implementation of heat sealing involves a direct contact method. This method involves contacting a constantly heated die or sealing bar to a specific contact area or path along surfaces of thermoplastic or elastomeric materials to be sealed or seamed together. In some sealing and seaming operations, thermoset adhesives are applied along the contact area or path and, once activated, form the seam or seal with the material. Alternatively, and without using a thermoset adhesive, hot air can be used to apply heat to the contact area or path along the thermoplastic, elastomeric, or similar material to melt the contact area or path for later fusion to form the seam or seal.

Heat sealing is in wide spread use. For example, it is used to weld electronics components and medical test devices. Heat sealing is also used to seal laminate foils and films to medical devices, such as, trays, bottles, and containers, to prevent contamination of such devices. In the medical and food industries, heat sealing is used to manufacture bags and other flexible containers. Heat sealing is also used to weld the perimeter of thermoplastic materials to form bags and/or for sealing ports and tubes into the bags.

Heat sealing can be used to weld sheets or films of thermoplastic material together with lap seams and other types of seams to form larger pieces of material. It is also used to form single-fold and double fold edge seams along pieces of material. For example, U.S. Pat. No. 4,737,213 teaches a heat sealing process for joining thermoplastic sheets together with lap seams. The process involves directing hot air through several discharge orifices of a nozzle against overlapping upper and lower thermoplastic membranes. The hot air heats contact surfaces of the membrane to its fusion temperature. Then, pressure is applied to the overlapping membranes along the contact surface to join the seam and to create larger sheets of water-resistant membranes for architectural applications. Another method taught by U.S. Pat. No. 6,250,048 uses heat sealing to form tube stock from polyethylene film. A hot air dispenser delivers hot air through a plurality of hot air discharge jets to form a lap seal along overlapping edges of the material, which are then fused along the lap seal to form the tube stock. The tube stock can then be formed into bags with a form-fill-seal machine. Finally, U.S. Patent Application Publication No. 20110083803 teaches a welding machine that uses a hot air nozzle, a hot wedge, or other welding device to join thermoplastic material with a lap seam. The larger pieces of material can be used to manufacture tarps, awnings, tents, and inflatables.

Heat sealing with air delivery techniques has specific applications in bag forming and sealing operations. In an example disclosed in U.S. Pat. No. 3,286,433, a horizontal bag top sealing machine is used to seal filled bags. Positioned within the sealing machine are opposing slots used to direct hot air transversely and inwardly toward an unfolded bag top as the machine passes the bag top horizontally between the opposing slots. The slots are elongated horizontally along the entire length of opposing plenum chambers used to deliver the hot air through the elongated slots. The hot air forms a heat seal bead across the bag top. Similarly, U.S. Pat. No. 5,184,447 teaches using hot air to seal a bag top passing by pairs of nozzles that are positioned in a manner that the nozzles direct air against external sides of the sealing area of the bag top as the bag passes by the nozzles. In this system, hot air impinges on the sealing area to active a heat sealable material used to seal the bag. Finally, U.S. Pat. No. 6,170,238 teaches sealing bag lips with hot air directed through elongated slots against the bag lips as they pass by the elongated slots.

Horizontal fill, fold, and seal machines use heating sealing to seal folded tops of pre-filled bags. A horizontal fill, fold and seal machine performs several continuous steps. It first fills a bag with content, and then, as the filled bag is passed along the machine, a folding apparatus folds the open bag top over into a u-shaped arch. Next, the machine heat seals the folded bag top by directing hot air along the underside portion of the u-shaped arch to heat the bag to a fusion temperature while the bag top passes horizontally by and downstream from the hot air delivery mechanism and, thereafter, by compressing the folded bag top to set the seal. The hot air can also be used to activate a thermoset adhesive deposited along an interior surface of the u-shaped arch. In contrast, a vertical fill, fold and seal machine performs similar steps of filling, folding, and sealing, but rather in a vertical process flow.

Various forms of devices have been used to deliver hot air for heat sealing in fill, fold and seal machines. For example, U.S. Pat. No. 3,381,448 teaches a nozzle that is positioned under a bag top folder mechanism and elongated in the direction of movement of a bag through the fill, fold and seal apparatus. The nozzle has a vertical top wall with a plurality of apertures that discharge pressurized, hot air upwardly against the underside portion of the folded bag top as the bag top passes horizontally by and downstream from the nozzle. Similarly U.S. Pat. No. 4,578,924 and U.S. Patent Application Publication No. 20130016926 teach jetting hot air through nozzles upwardly against the underside portion of the folded bag top as the bag top passes the nozzle.

Heat sealing thermoplastic or other material with hot air requires controlling the airstream of hot air discharged against the surface of the thermoplastic material along the path where the seam or seal will be formed. There are at least three critical aspects of heat sealing, namely, (1) temperature of the hot air, (2) the time of exposure of the material, such as thermoplastic material, to the hot air, and (3) the path along the material to which the airstream is delivered.

Two notable problems may generally arise during heat sealing, namely, overheating or under heating at the path along the material in which a seam or seal will be formed with the material. For example, overheating a material, e.g., thermoplastic, elastomeric, or other "meltable" material, can cause it to shrink, shrivel, or form holes along a part(s) of or the entire length of the region of the material where the hot air was directed. Overheating can be caused by any one or more of: (a) inconsistent, non-uniform heat delivered by a hot air nozzle, (b) heating the hot air to too high a temperature, and/or (c) exposing the material to hot air for too much time. In contrast, under heating prevents a material from being uniformly heated to a fusion temperature along all or portions of the intended path of formation of the seal or seam. In either case, the resulting seal or seam may be partially formed, uneven and/or weak. In either case, the seam or seal is susceptible to breakage or failure due to physical stresses placed on the seal or seam, leakage of contents contained by the seam, and/or intrusion of air, liquids, solids, or vermin or insects from outside the seam.

Prior art air nozzles tend to significantly contribute to turbulent air flow dynamics external to the nozzle that cause inconsistent airflow and uneven heat transfer. With prior art nozzles, heated air rapidly exits apertures, holes or slots and then turbulently mixes with the air external to the nozzle. This creates an asymmetrical and inconsistent air flow pattern jetting from prior art nozzles. Without being bound by any air flow dynamics theory, the air turbulence is exacerbated especially if a nozzle has numerous apertures, holes or slots, such as the prior art nozzle illustrated in FIG. 1. In this figure, the plurality of holes in the prior art nozzle direct airflow in multiple airstreams S with overlapping eddies E that create a swirling turbulence of hot air next to dead spots D adjacent the nozzle and the multiple airstreams S. The eddies E tend to lack consistent heated airflow and the dead spots D generally contain no heated airflow except that which may bleed back into the dead spots D. The eddies E and dead spots D provide inconsistent, asymmetrical airflow patterns external to the nozzle that unevenly heat the material to be sealed and, consequently, create some weak and inconsistent seals.

Indeed, the prior art heat sealing processes and apparatus suffer from hot air delivery devices, such as nozzles and the like, having slots, pluralities of holes or other communications that: (i) discharge an asymmetric, variable airstream pattern(s), as shown, for example in FIG. 1, (ii) unevenly transfer heat to thermoplastic or other material being sealed, and consequently (iii) create partially formed, uneven, and/or weak seams or seals in a thermoplastic material or other material, as well as incomplete barriers to leakage and/or intrusion.

Therefore, there is a present need for an improved hot air nozzle, as well as processes and systems of use thereof, that can: (1) discharge a more symmetric or precise airstream pattern for use in heat sealing shown, for example, in FIG. 2; (2) provide a more even heat transfer to material to be sealed or seamed in a heat sealing operation; (3) create a more uniform weld along a desired location for a seam or seal of a material; (4) create a seam or seal with a more even seal strength across the face of a seal or seam of the material; (5) create a barrier to prevent or reduce: (a) leakage of content that may be sealed in a bag or other container formed by heat sealing and/or (b) intrusion of air, water, and/or solids and/or vermin or insects through the seam or seal, such as, particularly with regard to sealed bags and/or containers used for medical applications and food containment and transport; and (6) be easily integrated into: (a) bag top sealing operations performed by fill, fold and seal machines, (b) bag forming operations performed by form, fill, and seal machines, and (c) seaming or sealing operations performed by seam sealer machines.

BRIEF DESCRIPTION OF THE FIGURES

Additional aspects, features, and advantages of the invention, as to its structure, assembly and use, will be understood and become more readily apparent when the invention is considered in light of the following description of illustrative embodiments made in conjunction with the accompanying figure, wherein:

FIG. 3 shows a side elevational view of a nozzle of the present invention.

FIG. 4 shows a rear elevational view of the nozzle shown in FIG. 3.

FIG. 5 shows a rear sectional view of the nozzle shown in FIG. 4.

FIG. 16 shows a side elevational view of an alternative nozzle of the present invention having an internal post.

FIG. 17 shows a rear elevational view of the nozzle shown in FIG. 16.

FIG. 18 shows a rear sectional view of the nozzle shown in FIG. 17.

FIG. 19 shows a side elevational view of another alternative nozzle of the present invention having two internal posts.

FIG. 20 shows a rear elevational view of the nozzle shown in FIG. 19.

FIG. 21 shows a rear sectional view of the nozzle shown in FIG. 20.

FIG. 26 shows a side elevational view of a nozzle of the present invention having two internal posts.

FIG. 27 shows a rear elevational view of the nozzle shown in FIG. 26.

FIG. 28 shows a rear sectional view of the nozzle shown in FIG. 27.

FIG. 29 shows a side elevational view of a nozzle of the present invention having three internal posts.

FIG. 30 shows a rear elevational view of the nozzle shown in FIG. 29.

FIG. 31 shows a rear sectional view of the nozzle shown in FIG. 30.

DETAILED DESCRIPTION OF EMBODIMENTS OF THE INVENTION

Figure 1:
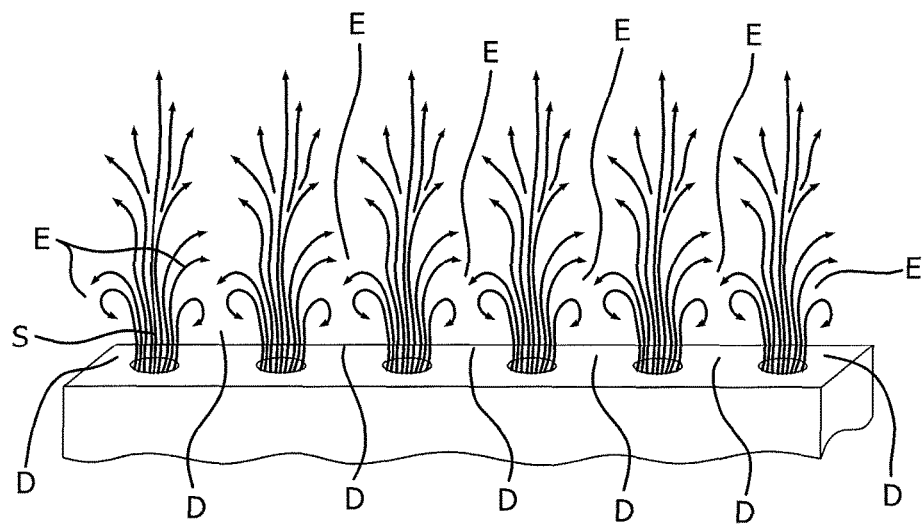
FIG. 1 shows an airflow pattern through a prior art nozzle.

Illustrative and alternative embodiments of an improved hot air nozzle 100 useful for heat sealing or heat seaming processes, systems, and apparatus are described in detail with reference being made to the figures of this application. Although similar aspects of embodiments are featured throughout this disclosure and are readily apparent, these similarities may be repeated within the context of the various embodiments of the processes of use thereof in heat sealing or heat seaming operations and apparatus.

The term "thermoplastic material" is used in this disclosure in its ordinary meaning to generally refer to film, roll, sheet, membrane, woven, or multilayer laminated material comprising a polymer that becomes pliable, moldable, or melted at specific temperatures and then returns to a solid state upon cooling. General, non-limiting examples of thermoplastic material include polyethylene, polypropylene, and polybutylene. Specific, non-limiting examples described within the context of this disclosure include poly woven material (also referred to as "woven polypropylene," "plastic woven material," or "woven polyethylene").

The term "elastomeric material" is used in this disclosure in its ordinary meaning to generally refer to a film, roll, sheet, membrane, or other material comprising a polymer with viscoelasticity that may be a thermoset or thermoplastic.

The term "material" may be used generally to refer to thermoplastic material, elastomeric material, or other material.

The term "fusion temperature" is any temperature at which a thermoplastic material or elastomeric material can be melted so that, when the melted surface of the material contacts another melted or non-melted surface of the same or different material, the melted surface(s) fuse together to form a seam or seal along the melted surface as the melted material returns to a solid state. The fusion temperature may be less than, equal to, or greater than the melting temperature of the thermoplastic material or elastomeric material depending upon the nature of the material.

The term "heat sealing" is used in this disclosure in its ordinary meaning to refer to a process of bonding, joining or welding thermoplastic, elastomeric, or other meltable material along a seam or seal by applying heated air to a surface of the material to precisely heat part of a surface of the material to a fusion temperature. Heat sealing may be used to bond, join, or weld similar or different material by directing heat to the material along a desired path of the material to reach the material's fusion temperature and then by contacting the "melted" surface(s) to form a seal and optionally applying pressure to the material along the same heated path. Heat sealing may also include using heat to activate a thermoset adhesive used to create a seal or seam with thermoplastic, elastomeric, paper, or other paper or fabric material. The term "heat sealing" can also be referred to as "heat seaming," "welding," or "heat welding."

The term "form, fill and seal machine" refers to a type of automated, continuous operation system used to package food, medical devices, or other products. In a continuous process, a form, fill and seal machine forms tube stock from rolls of flat thermoplastic film, membranes, sheets, or the like, then fills a cross-sealed portion of tube stock with solid or liquid product, and finally seals the filled tube stock to form a bag with another cross-seal. The process steps for a form, fill, and seal machine are described in more detail in U.S. Pat. No. 6,250,048. Non-limiting examples of vertical form, fill and seal machines (VFFS) include VFFS series machines manufactured by Viking Masek, HDG-Packing, Bosch, and GlobalSpec. Non-limiting examples of horizontal form, fill and seal machines (HFFS) include HFFS machines manufactured by Circle Packaging Machinery and Wilpack Packaging, as well as the apparatus described in U.S. Pat. No. 6,185,907.

The term "fill, fold and seal machine" is used in reference to a type of continuous operation system commonly used to package human or pet food and other fungible products. In a continuous process, a fill, fold and seal machine fills preformed plastic, fabric or paper bags with solid, fungible, or liquid product, then aligns and folds the bag top, and finally seals the filled bag along the folded bag top portion. The sealing process may or may not involve thermosetting adhesives. Non-limiting examples of fill, fold and seal machines include those described in U.S. Pat. Nos. 3,381,448 and 4,578,924, as well as the apparatus described in U.S. Patent Publication No. 20120227363. Further examples include open mouth baggers manufactured by Premier Tech and bag sealing systems (PS400) manufactured by Miller Weldmaster.

The term "seam sealer machine" is used in reference to a machine that carries out a heat sealing process that directs hot air between overlapping edges of material(s) to effect a heat-formed seal therebetween with pressure applied to the seal after the heat application. For example, a seam sealing process and apparatus is described in U.S. Pat. No. 4,737,213, as well as in U.S. Patent Publication No. 20110083803. Non-limiting examples of seam sealer machines also include hot air tools manufactured by Miller Weldmaster useful for seaming together or edge sealing materials to form awnings, tarps, tarpaulins, inflatables, signs, pool linings, tents, and the like.

The term "seal strength" is used in its ordinary meaning to refer to the tensile strength of a seal measured by the force necessary to separate two layers of a seal or the tensile strength of the force necessary to break a piece of material. Seal strength can be determined by pull test or tensile test known or used in the art. Seal strength can be measured in pounds of force per inch of width. For the purposes of this disclosure, seal strength was evaluated using the Standard Test Method for Seal Strength of Flexible Barrier Materials (ASTM F88/F88M-09).

The term "hot air nozzle" is used to refer to a replaceable nozzle for heat sealing as more particularly described in the non-limiting embodiments in this disclosure.

Figure 2:
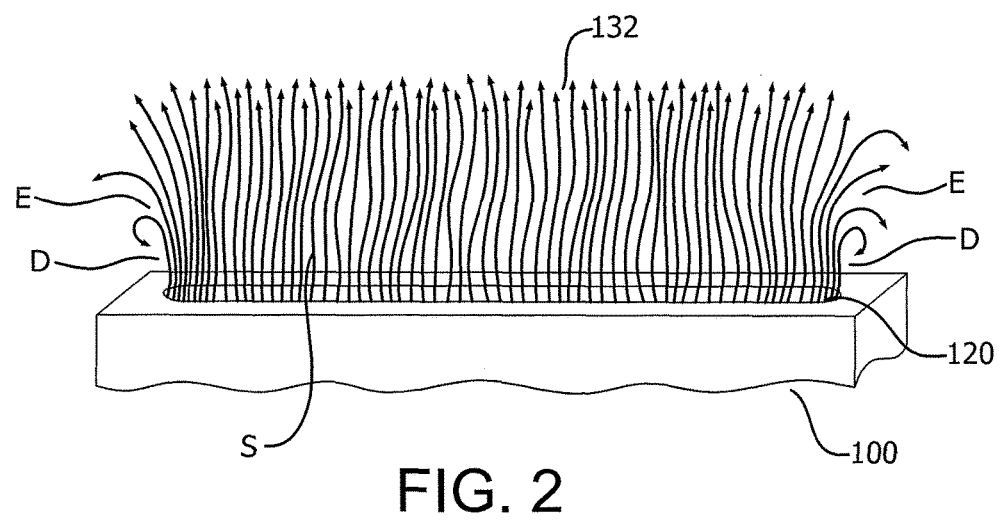
FIG. 2 shows an airflow pattern through a nozzle of the present invention.

A purpose of the invention is to provide a hot air nozzle 100, such as any of the embodiments shown in FIGS. 3-5 and 16-31, configured to discharge a precise, symmetric and uniform airstream pattern of heated air, as shown for example in FIG. 2, for heat sealing thermoplastic or other materials. The hot air nozzle 100 maximizes airflow, and it also minimizes, and even eliminates, the potential for damage to material that is being heat sealed that is commonly caused by prior art hot air nozzles, also referred to as welding tips. This damage includes material degradation or over melting caused by misaligned material, over melting of properly aligned material, and/or inadvertent scoring of material passing the nozzle.

Another purpose of the invention is to use the hot air nozzle 100 to evenly and consistently transfer heat in an intended path along a material in preparation to form a seal or seam along the path. A further purpose of the invention is to provide a hot air nozzle 100 configured to create a uniform weld along a seam or seal of material. Yet another purpose of the invention is to create welds with the hot air nozzle 100 having an even pull strength across the face of the seal or seam whereby the seal or seam has improved strength over seals or seams created by prior art systems.

An even further purpose is to provide a hot air nozzle 100, as well as processes and systems of use thereof, that can be readily incorporated into heat sealing processes such as, for example, bag top forming and sealing processes performed by form, fill, and seal machines and by fill, fold and seal machines, as well as seaming processes performed by seam sealer machines.

In accordance with the invention, the seam or seal formed by the present invention may be airtight. The seal formed with a bag or container may be provided as a barrier that prevents the contents sealed in the bag from leaking out of, or conversely, contaminants from getting into, the sealed bag or container. Non-limiting examples of sealed content include fungible goods such as cement, concrete, fertilizer, seed, corn, grains, animal feed, dog food, cat food, sugar, flour, and the like. In alternative embodiments, the seal of a bag containing fungible goods may serve as a protective barrier to prevent insects and/or vermin from entering the bag through the seal, thereby protecting against contamination of the contents of the bag.

FIGS. 3-5, as well as FIGS. 16-31, illustrate embodiments of the hot air nozzle 100 comprising a blade 102 with an integral member 104 extending away from a side surface 106 of the blade 102. The blade 102 comprises a rectangular profile (along the side views thereof) that has a horizontal bend 108 at angle α above a lower portion of the blade 102. In alternative embodiments, the blade 102 may be flat, rather than bent at angle α. In further alternative embodiments, angle α forming the bend 108 can be approximately 35 degrees or other acute angle, or even an oblique angle, that supports operability of the hot air nozzle 100 in a heat sealing process.

Referring again to FIGS. 3-5 and 16-31, the blade 102 is defined by a top edge 110, a front or "leading" edge 112 that is configured upstream relative to a process flow in a heat sealing operation, a side surface 114, a side surface 106, a bottom edge 116, and a rear or "trailing" edge 118 that is configured downstream relative to a process flow in a heat sealing operation. In an illustrative, non-limiting embodiment, the blade 102 has a length of about ¾ inches, a height of about 3¾ inches (with about 2 inches above the bend 108 and 1¾ inches below the bend 108), and width of about ⅛ of an inch. The length, height, and width of the blade 102 are non-limiting factors and can be modified to meet requirements of any heat sealing operation.

FIGS. 5, 18, 21, 28, and 31 show the air channel chamber 122 of the blade 102 defined by internal surfaces 124 of the blade 102. Located within the blade 102, air channel chamber 122 has an internal length, height, and width. In an illustrative, non-limiting embodiment, the air channel chamber 122 has a length of about ½ of an inch, a height of about 3½ inches (with about 1¾ inches above the bend 108 and 1½ inches below the bend 108), and width of about 1/16 of an inch. The internal length, width, and height of the air channel chamber 122 are non-limiting factors and can be modified to meet the requirements of any heat sealing operation so long as it provides communication between the opening 120 and the communication 126 of integral member 104 of the hot air nozzle 100.

Referring again to FIGS. 3-5, as well as FIGS. 16-31, the blade 102 includes integral member 104 extending away from the side surface 106 of the blade 102. In an illustrative embodiment, the integral member 104 is cylindrically shaped having a length with a communication 126, e.g., bore, from its side surface 134 along its length to the air channel chamber 122 within the blade 102. In alternative embodiments, the integral member 104 may have any other external 3-dimensional geometric shape. The integral member 104 is configured to secure the hot air nozzle 100 with an exit port of a hot air tool 205 at an appropriate distance so that blade 102 can be properly positioned for a heat sealing operation. The integral member 104 also operates as a conduit to pass heated air from the hot air tool 205 to the air channel chamber 122 so that the heated air can be discharged through the opening 120 in an airstream pattern 132, shown for example in FIGS. 6 and 7, during heat sealing. This length can be scaled up or down for any heat sealing operation. Consequently, the integral member 104 can be any suitable length. In a non-limiting, illustrative embodiment, the length of integral member is about 1½ inches along its upper surface.

Figure 23:
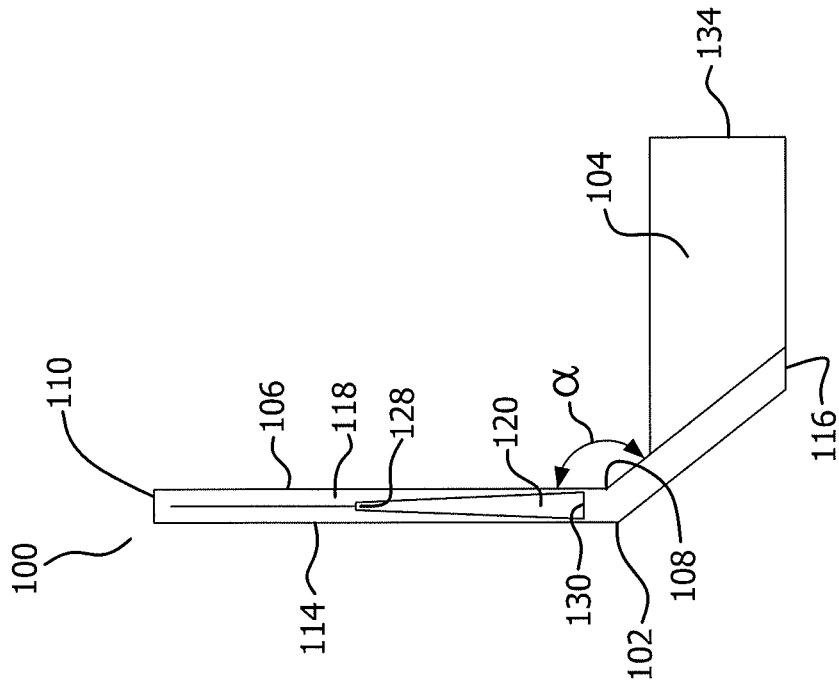
FIG. 23 shows a rear elevational view of yet another alternative nozzle of the present invention.
Figure 22:
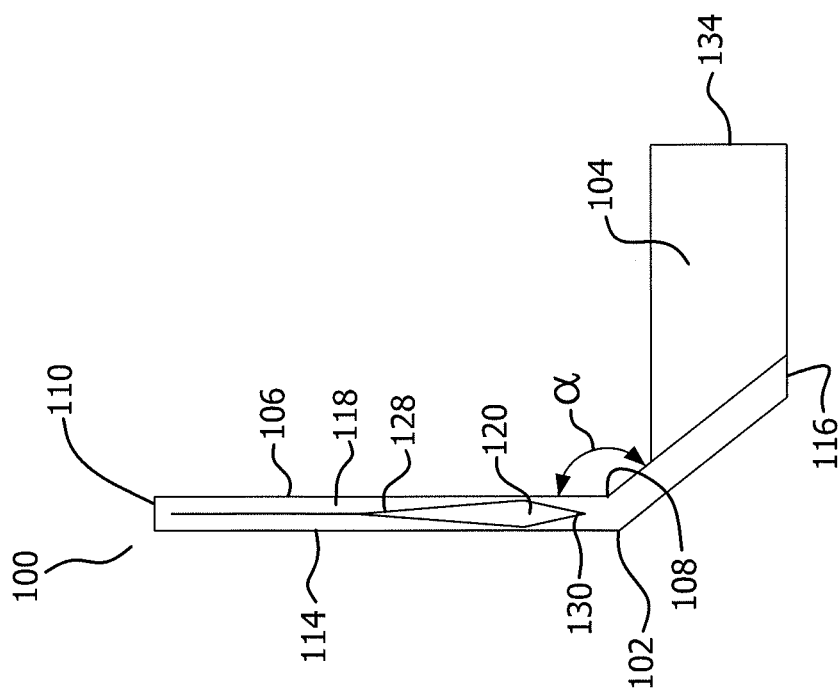
FIG. 22 shows a rear elevational view of another alternative nozzle of the present invention.
Figure 24:
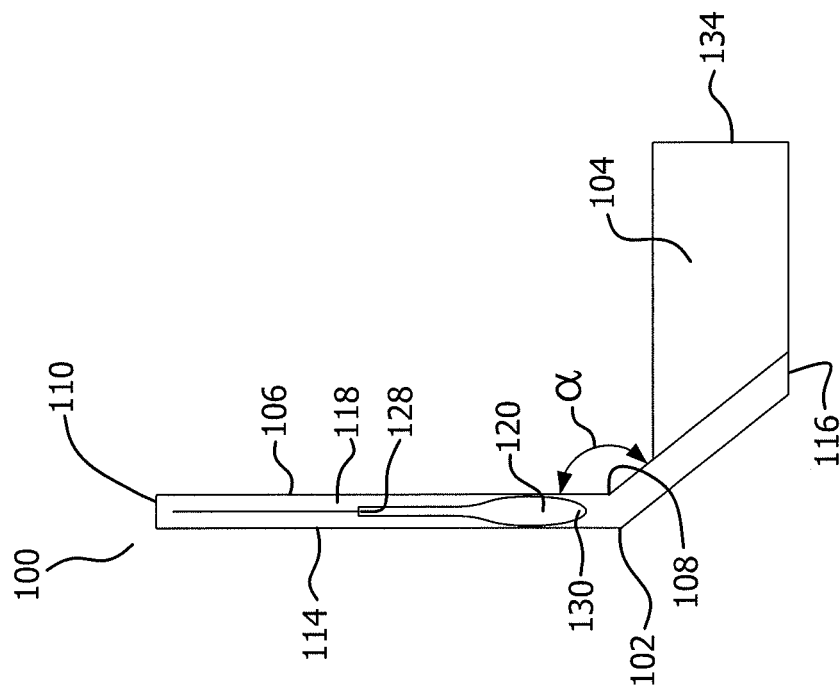
FIG. 24 shows a rear elevational view of yet a further alternative nozzle of the present invention.
Figure 25:
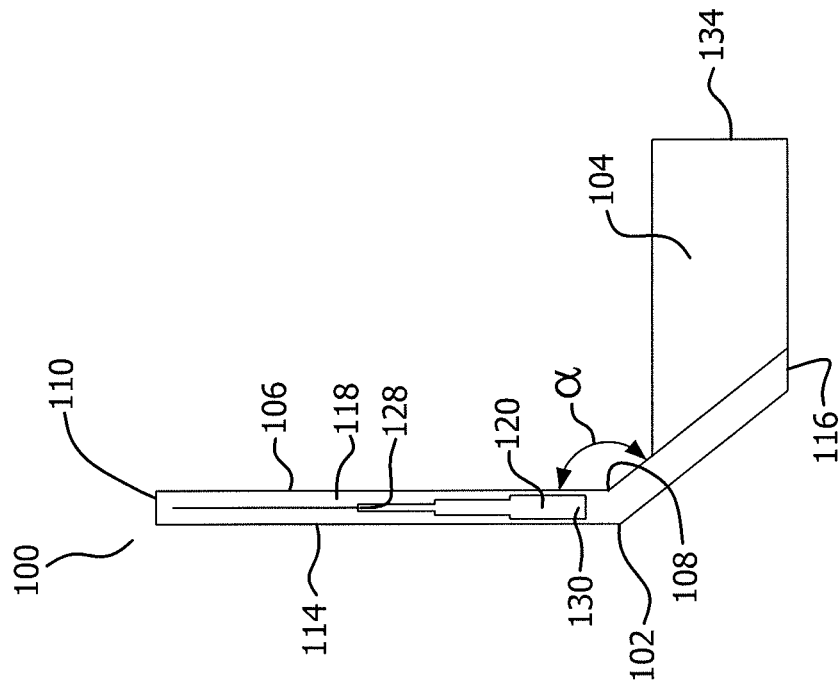
FIG. 25 shows a rear elevational view of an even further alternative nozzle of the present invention.

Referring now to FIGS. 3-5, as well as FIGS. 16-31, the opening 120 communicates through the rear or "trailing" edge 118 of the blade 102 to the air channel chamber 122. The profile of the opening 120 may be defined by at least one or more linear edges and comprise any geometric shape. The profile of the opening 120 may be symmetrical. For example, the opening 120 may have a profile that is triangular as shown in FIG. 4, rectangular as shown in FIGS. 17 and 20, quadrilateral as shown in FIG. 22, trapezoidal as shown in FIG. 23, a single-stepped configuration or double-stepped configuration as shown in FIG. 25, or other configuration linearly defined.

In contrast with the linear profiles of the opening 120 shown in FIGS. 4, 17, 20, 22, 23, and 25, opening 120 may also be defined by one or more curvilinear edges. For example, curvilinear edges define the "banjo" shaped profile shown in FIG. 24. Alternative embodiments of the opening 120 may also have a profile comprising a combination of at least one linear edge and at least one curvilinear edge.

FIGS. 4, 17, 20, 22, 23, 24, and 25, for example, show the opening 120 comprising a height, an upper width, and a lower width. The width of the upper end 128 and the lower end 130 of the opening 120 may be the same, such as, for example, as shown in the rectangular profile of the opening 120 in FIGS. 17 and 20, or may be different, such as, for example, as shown in the triangular, quadrilateral, rhomboid, banjo, and double-stepped configurations shown in FIGS. 4 and 22-25, respectively.

With heated air flowing through the hot air nozzle 100, the profile of the opening 120 directs a precise, uniform airstream, as shown for example in FIG. 2. The triangular profile of the opening 120 in FIG. 4, the quadrilateral profile of the opening 120 in FIG. 22, the trapezoidal profile of the opening 120 in FIG. 23, the "banjo" profile of the opening 120 in FIG. 24, and the double-stepped profiled in FIG. 25, each have a width near the lower end 130 of the opening 120 that is wider than the width near the upper end 128. This wider width at or near the bottom of the opening 120 concentrates a maximum heated airstream from at or near the bottom of the opening 120. Alternatively, the airstream may also be directed out of the entirety of the rectangular profile shown in FIGS. 17 and 20. In further alternative embodiments, the upper width may be wider in comparison to the bottom width of the opening 120. This will deliver the maximum heated airstream of hot air near the top of the opening 120.

The size and shape of all embodiments of the opening 120 may be modified so long as the opening 120 is configured to discharge a symmetric, uniform airstream pattern 132 of hot air out of the air channel chamber 122 and downstream (relative to a process flow D of a heat sealing operation as shown in FIGS. 6, 7, 12, and 14) from the trailing edge 118 of the hot air nozzle 100.

FIGS. 4, 17, 20, and 22-25 illustrate the opening 120 generally centered vertically in the rear or "trailing" edge 118 from the top 110 and bottom 116 of the blade 102. More specifically, the opening 120 is shown in FIGS. 4, 17, 20, and 22-25 positioned above the bend 108 of the blade 102 in the rear or "trailing" edge 118. In alternative configurations, the opening 120 can be vertically positioned higher or lower along the rear or "trailing" edge 118 of the blade 102 so long as the opening 120 discharges an airstream pattern 132 of heated air at a desired location along a path on the surface of the thermoplastic material, elastomeric material, or other material during a heat sealing operation.

Figure 6:
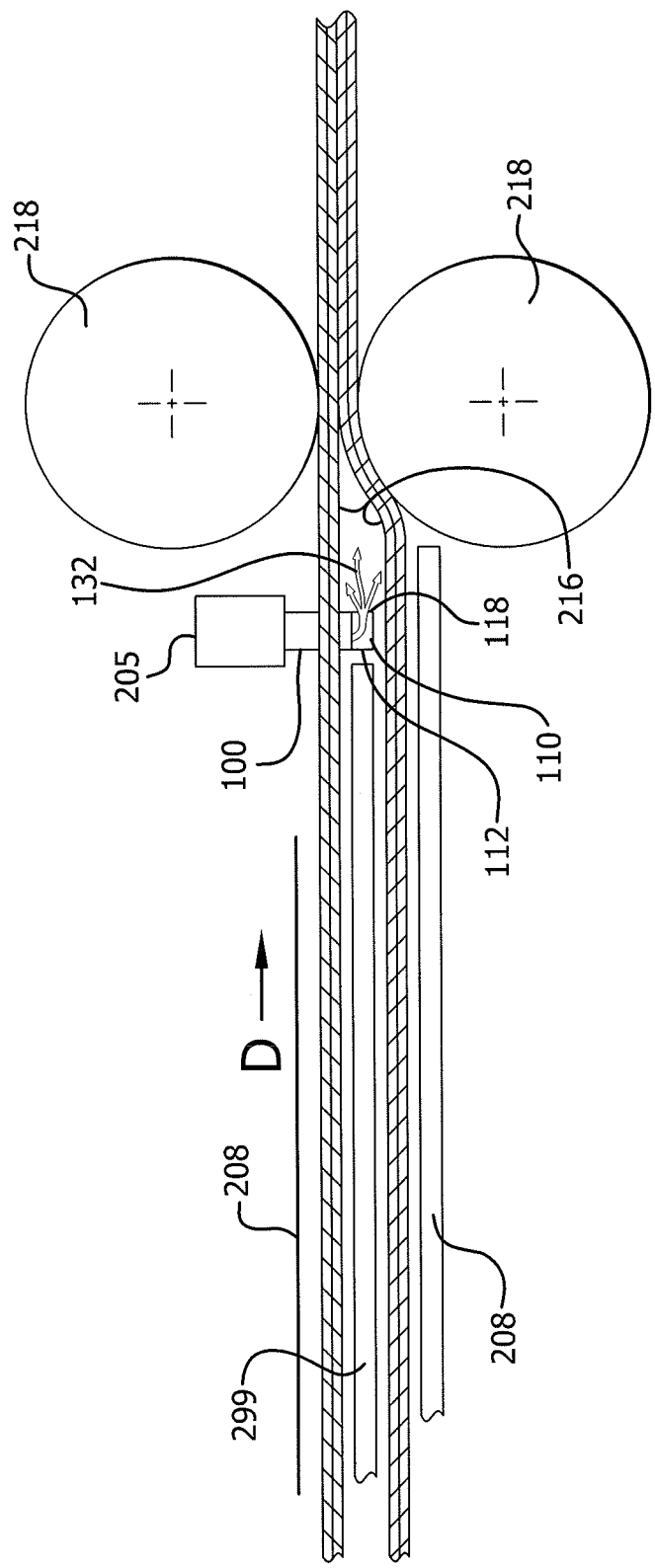
FIG. 6 shows is a top partial sectional view of a horizontal fill, fold and seal machine (along line 6 of FIG. 7) with the nozzle of the invention positioned: (i) under an inverted u-shaped folding mechanism and not aligning with or extending beyond the downstream end of the folding mechanism, (ii) within a u-shaped fold of a bag top passing through the folder mechanism, (iii) downstream from the inner guide rail 299 positioned under the inverted u-shaped folding mechanism, and (iv) upstream from compression rollers positioned downstream from the nozzle and folding mechanism in the process.
Figure 7:
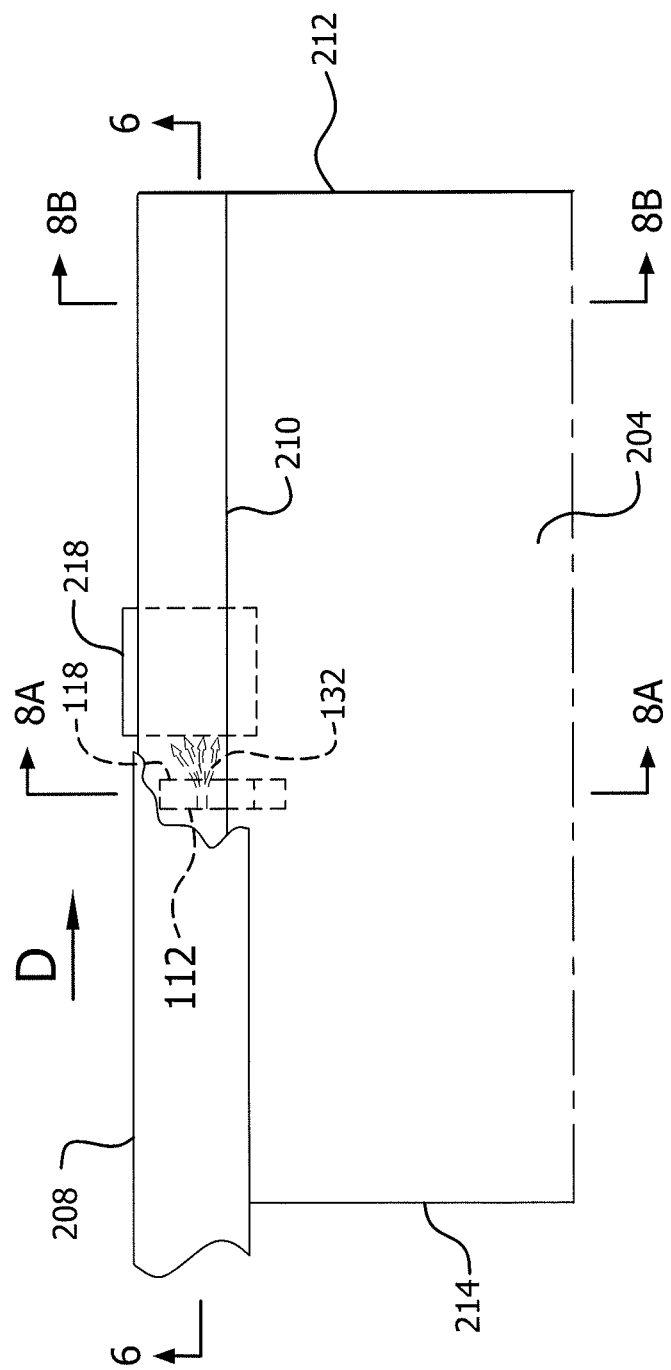
FIG. 7 shows a side partial view of the horizontal fill, fold and seal machine shown in FIG. 6.

In the process flow D shown in FIGS. 6 and 7, the thermoplastic material passes the hot air nozzle 100 from the front or "leading edge" 112 to the rear or "trailing" edge 118, along with the opening 120, of the blade 102. Alternatively, the front or "leading" edge 112 and the trailing edge of the blade 102, as well as the opening 120, can also be switched for a process flow direction that is opposite to the process flow D. In either configuration, the opening 120 discharges airstream pattern 132 downstream from the hot air nozzle 102 in the same process flow direction D.

Internal structural support may be provided within the air channel chamber 122 of the hot air nozzle 100. The support aims to prevent warping, twisting, or other physical deformation of the blade 102 that may be caused by high heat exposure and repeated use of the hot air nozzle 100. One or more internal posts may be affixed to the internal surface 124 of the side 114 and the internal surface 124 of the side 106 of air channel chamber 122 as shown, for example, in FIGS. 16-18, 19-21, and 26-28. The sectional profile of an internal post may be round, triangular as shown in FIGS. 26 and 29, an airfoil shown in FIGS. 16 and 19, or other geometric shape.

An embodiment of the hot air nozzle 100 is shown in FIGS. 16-18 as having nearly the same or similar structural features of the hot air nozzle 100 of FIGS. 3-5. It also includes a post 195 shown specifically in FIGS. 16 and 18.

In an alternative embodiment of the hot air nozzle 100 shown in FIGS. 19-21, two posts 197, 199 are affixed to the internal surface 124 of the side 114 and the internal surface 124 of the side 106 of air channel chamber 122 as shown specifically in FIGS. 19 and 21. The post 195 in FIGS. 2-5, and the posts 197, 199 in FIGS. 19 and 21, are positioned slightly above the upper end 128 of the opening 120 to avoid disruption of the consistency and symmetry of the heated air flowing through the air channel chamber 122 and discharged from opening 120 in the air stream pattern 132.

The internal structural support may also be located within the air channel chamber 122 for the purpose of directing the flow of heated air out of the opening 120. For example, two triangular-shaped posts 652, 654, shown in FIGS. 26-28, as well as the three triangular-shaped posts 652, 654, 656, shown in FIGS. 29-31, are provided within the air channel chamber 122 and adjacent to the opening 120. In either configuration, the triangular-shaped posts direct heated air flowing through the air channel chamber 122 out of the opening 120.

Figure 9A:
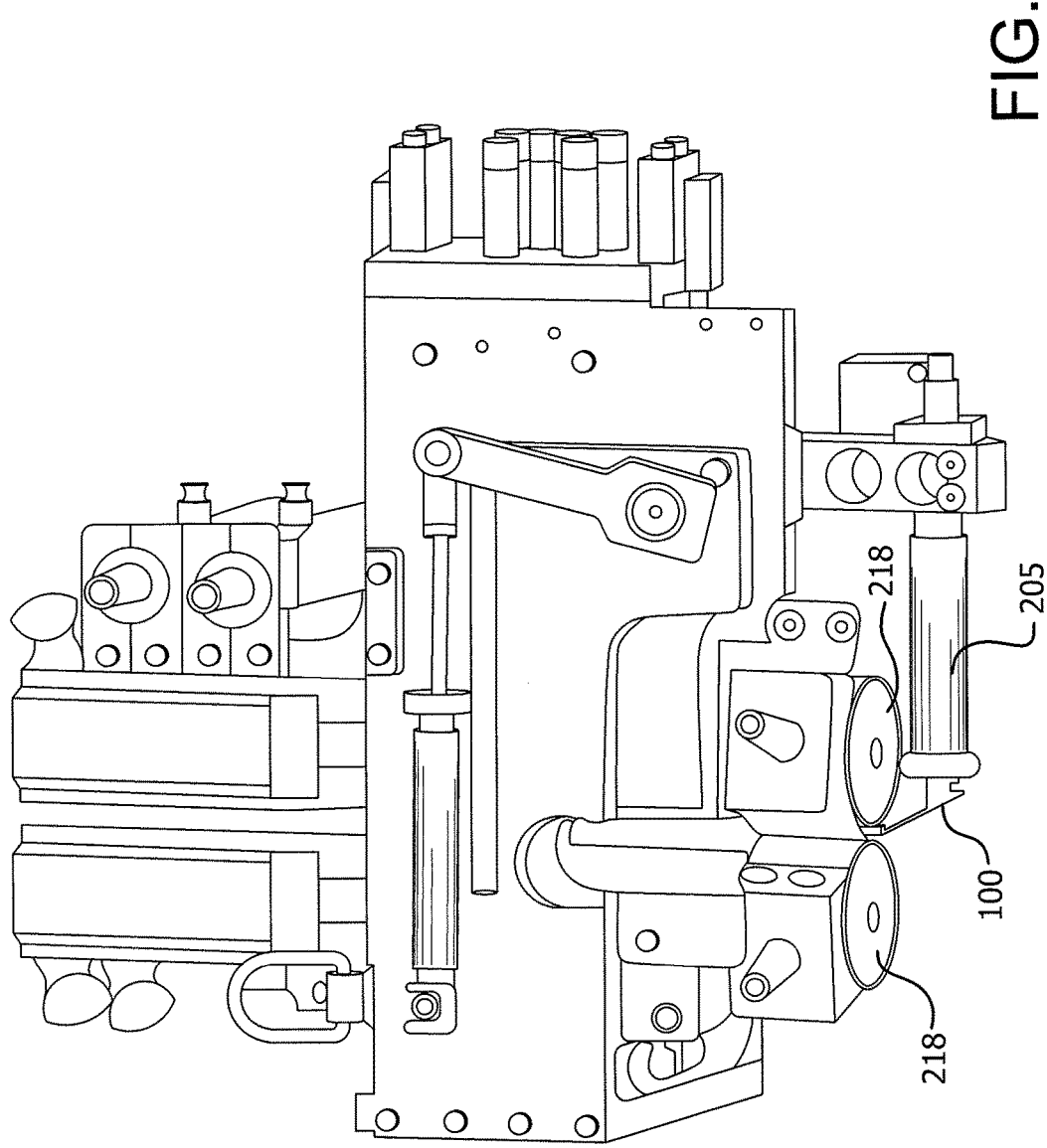
FIGS. 9A and 9B show partial views of a fill, fold, and seal machine with the nozzle of the invention attached to a swing arm used to deliver pressurized hot air from a hot air tool to the nozzle during operation.
Figure 9B:
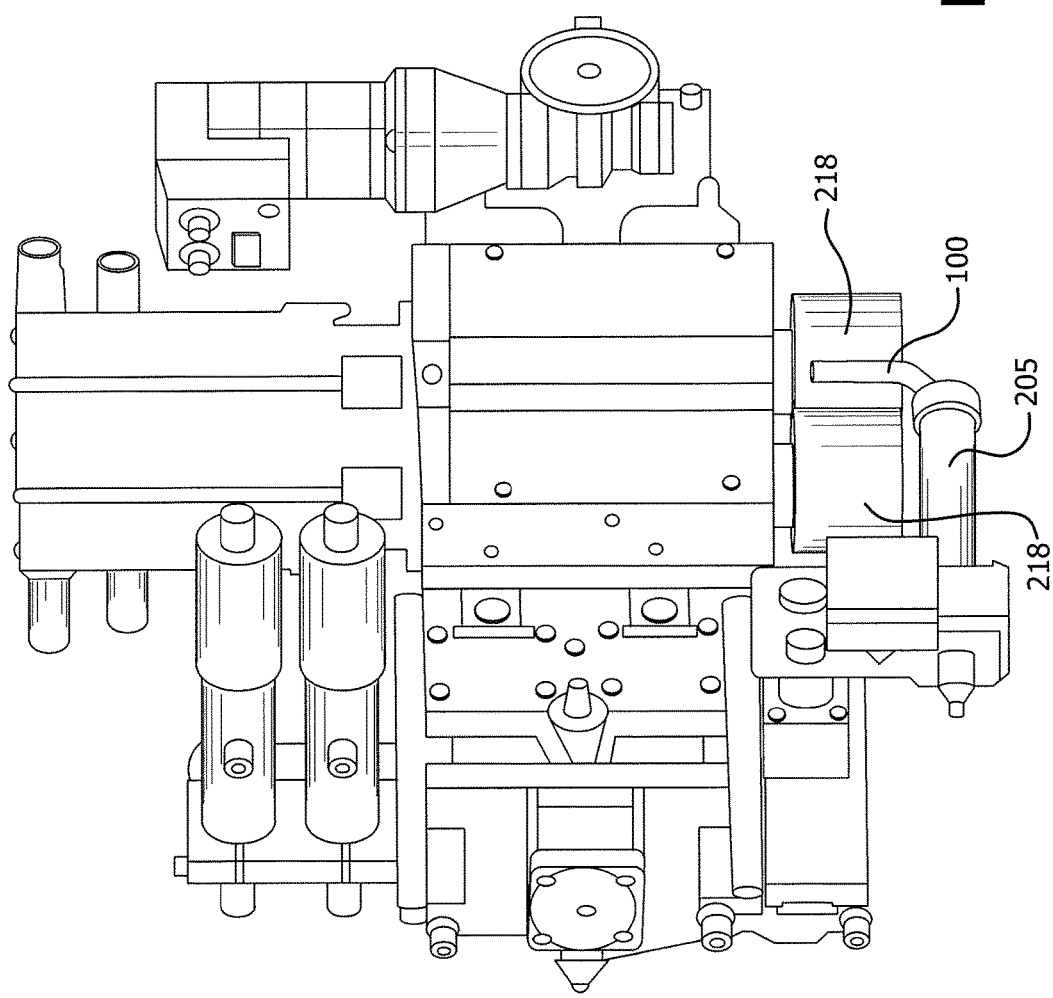
Figure 10:
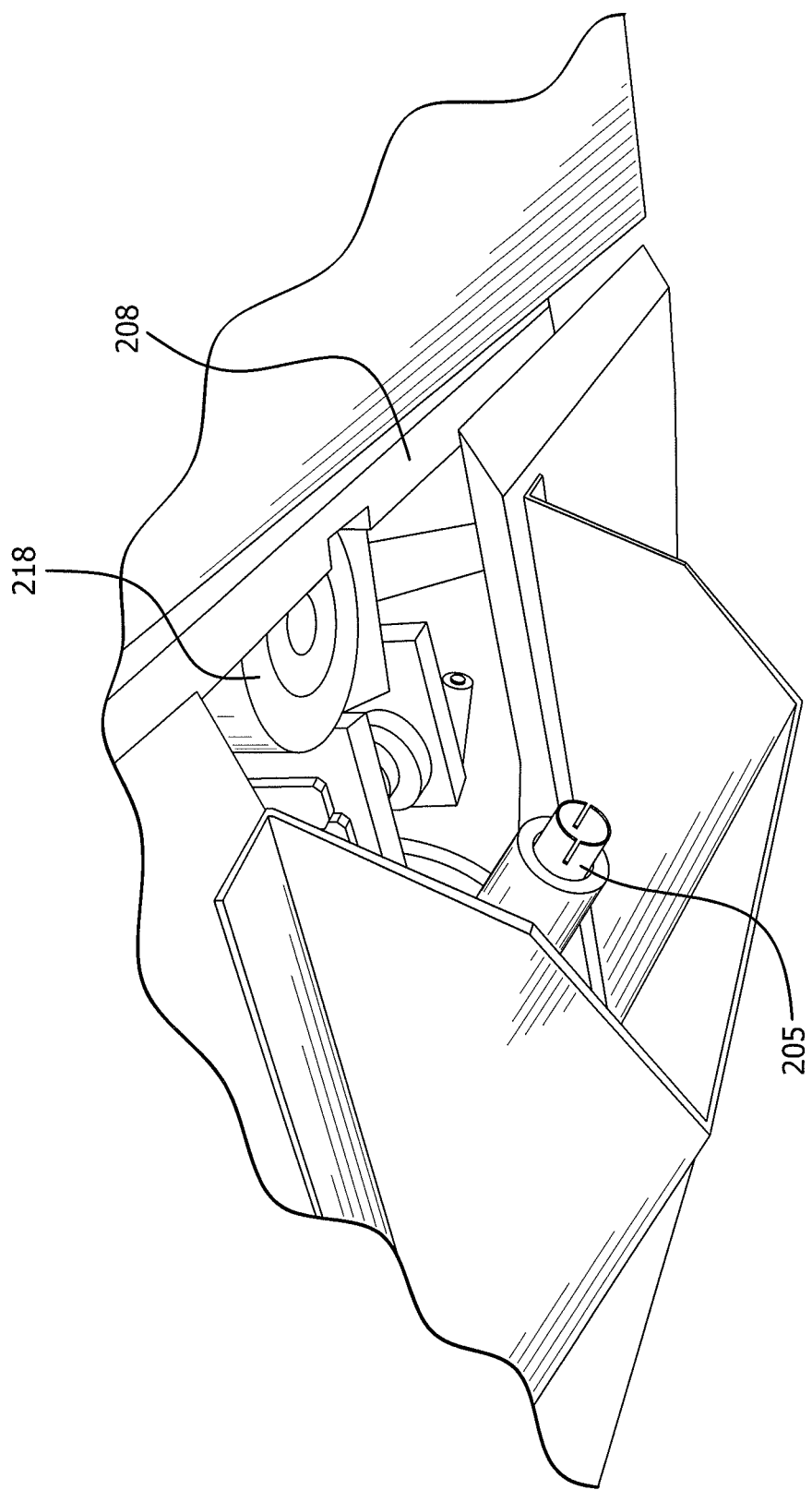
FIG. 10 shows a bottom perspective view of a horizontal fill, fold, and seal machine with the swing arm without a nozzle in a lowered position.
Figure 11:
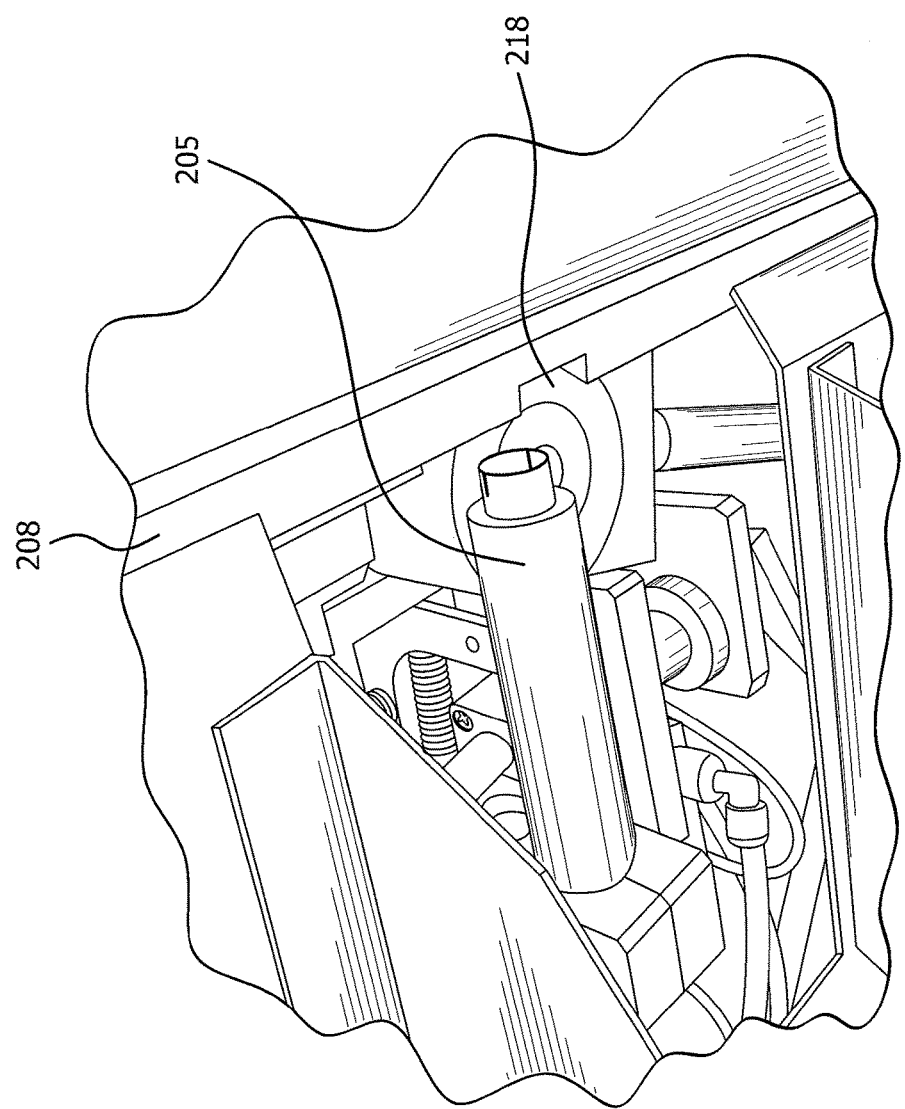
FIG. 11 shows another bottom perspective view of a horizontal fill, fold, and seal machine with the swing arm without a nozzle in a raised position.

The hot air nozzle 100 may be manufactured from any material capable of maintaining its structure without warping or other structural failure brought on by exposure to hot air flowing at a predetermined flow rate and temperature through the nozzle 100, as well as the forces encountered during use of the hot air nozzle 100 during heat sealing. In heat sealing operations, the hot air passing through the nozzle 100 may be heated by a heating system of a sealing machine, such as, for example, as shown in FIGS. 9A and 9B. The hot air may be provided at a temperature generally within a range of about 100 deg. C. to about 950 deg. C., specifically within a range of about 375 deg. C. to about 850 deg. C., and more specifically within a range of about 500 deg. C. to about 700 deg. C.

For example, the material used to manufacture the hot air nozzle 100 may comprise tungsten carbide, mild steel, stainless steel, laser sintered chrome cobalt, or other metal or metal alloy, or nonmetal composites, such as, for example, ceramics, boron ceramic, and the like. The hot air nozzle 100 may comprise a unibody or, alternatively, a combination of two or more pieces of material that are attached or fused by welding or other bonding technique.

The functional air flow characteristics of the hot air nozzle 100 in forming the airstream pattern 132 occur whether the hot air nozzle 100 is fixed at a location in a heat sealing operation, or, alternatively, it moves along thermoplastic or other material secured in a fixed position during heat sealing.

The airstream pattern 132 is used: (i) as positive pressure to create an air envelope around the hot air nozzle 100 by forcing material away from the nozzle while the material passes by the nozzle thereby preventing contact between the nozzle and the material, and (ii) to deposit heat precisely in a path along the material to heat the material at or above the material's melting temperature so that, when the heated material is compressed together by rollers, the opposing melted surfaces of the material contact one another and then fuse or bond to form a seal or seam.

In a specific embodiment, the opening 120 of hot air nozzle directs the airstream pattern 132 along regions 216 of the inner sides 202 of u-shaped fold 200 of a bag 204 positioned within the inverted u-shaped folding mechanism 208, as shown in FIGS. 6-8A. These figures illustrate use of the hot air nozzle 100 under and, also, upstream from the downstream end of the folding mechanism 208 of a fill, fold and seal machine in bag top sealing operation. The rear or "trailing" edge 118 of the blade of the hot air nozzle 100 does not align with or extend beyond the downstream end of the folding mechanism 208. In other heat sealing operations, such as seam sealing, the opening 120 directs airstream pattern 132 of hot air downstream from the hot air nozzle 100 and along the inner surface 406 of overlapping material (s) being sealed or seamed.

The seam or seal formed by heat sealing will generally have a width and a length. For example, the width of the seam or seal may be in the range of less than about 10 mm to about 55 mm or more depending upon the materials that are being sealed and desired strength of a seam or seal. More specifically, the width of the seam or seal may be between about 15 mm to about 45 mm, between about 35 mm to about 45, or between about 40 mm to about 45 mm. In all embodiments, the width of the seam or seal generally runs substantially the length of the material in which a seam or seal is being formed, e.g., from the upstream end to the downstream end of the material passing the hot air nozzle 100 during heat sealing.

More specifically, a fill, form, and seal operation uses heat sealing to weld closed an open end of a poly woven bag. The weld or seal is formed where the airstream 132 of heated air is deposited along a path on the overlapping upper edges of the bag 210 (after being folded over on the bag 204) and side portion of the bag 204 at a location below the fold. The width of the seal usually extends from the point of the folded overlapping upper edges 210 of the bag 204 up to a region below the fold. The width of the fold, which is the overlapping portion of a sealed bag extending from the fold to the seal, can range from about 0-2 inches or more. In a specific embodiment, the width of the fold is about 1¾ inches. The overlapping material at the fold is typically not heat sealed, but merely remains in contact due to the seal that is formed below the fold.

The hot air nozzle 100 creates a seam or seal having a seal strength across the face of the seal that is an improvement over to the seal strength of a seam or seal created by prior art hot air nozzles. This improved the seal strength is consistent across the face of the seal, as well as across the seals formed in bags or materials that are heat sealed with the hot air nozzle 100 during continuous heat sealing. There are significant benefits to improved seal strength, namely, prevention of sealed bags from breaking open due to failure of the seam or seal when a bag is exposed to force typical to packaging, transporting, and displaying the bags. Consequently, this reduces waste of bags and product and related financial loss to manufacturers.

The temperature of the heated air being discharged from the opening 120 of the hot air nozzle 100 may be provided at or above the melting temperature of the material that is being sealed or seamed. For example, the materials that are used in connection with this invention, e.g., thermoplastic material, elastomeric material, and the like, generally have melting temperatures in the range of about 105 deg. C. to above 265 deg. C. Polyethylene has a melting temperature between about 105 deg. C. to about 115 deg. C. for low density polyethylene and between about 120 deg. C. to about 180 deg. C. for high density polyethylene. Polypropylene has a melting temperature in the range of about 130 deg. C. to about 170 deg. C., while polybutylene has a melting temperature around 190 deg. C. In many embodiments, but not all, the temperature of the heated air will exceed the melting point of the material that is being sealed or seamed.

The heated air discharged by the hot air nozzle 100 may also be used to activate a thermoset material or thermosetting adhesive, such as a glue, film, or tape (Henkle or 3M thermoset adhesives), deposited along a path on a material (e.g., thermoplastic material, elastomeric material, paper or fabric) where the seal or seam will be formed. Thermoset adhesives have an activation temperature determined by the characteristics of the adhesive. For example, thermoset adhesives used for forming seals in the bag sealing processes are generally activated in the range of about 175 deg. C. to about 235 deg. C. or other temperature provided by the manufacturer. A thermoset material can be heated to its fusion temperature.

The hot air tool 205 delivers heated air to the air nozzle 100 at a preset air flow rate. For example, the air flow rate may be within a range of about 60 L/minute up to about 250 L/minute, a range of about 60 L/minute to about 120 L/minute, a range of about 80 L/minute to about 100 L/minute, or other rate that supports heat sealing.

The air flow rate is calibrated with a process speed (e.g., about 40 to about 80 feet per minute) which is the speed that the material to be sealed is passed through a heat sealing operation implementing the invention, as well as the temperature of the heated air (e.g., temperature in a range of about 100 deg. C. to about 950 deg. C.) that flows through the hot air nozzle 100. For example, the heat sealing operation may flow air to the hot air nozzle 100 that is heated to a temperature of about 500 deg. C. to about 680 deg. C. at an air flow rate of about 120 to about 200 L/minute at a process speed of about 40 to 70 feet per minute. Another non-limiting embodiment provides air heated at a temperature in a range of about 530 to 680 deg. C. provided at an air flow rate of about 120 L/minute in a process speed of about 70 feet per minute.

Other non-limiting embodiments of process speeds, air flow rates, and heated air temperatures include: (i) air heated to a temperature in a range of about 530 to 680 deg. C. provided at an air flow rate of about 120 L/minute in a process speed of about 70 feet per minute; (ii) air heated to a temperature in a range of about 530 to about 680 deg. C. provided at an air flow rate of about 170 L/minute in a process speed of about 70 feet per minute; (iii) air heated to a temperature in a range of about 530 to about 680 deg. C. provided at an air flow rate of about 175 L/minute in a process speed of about 70 feet per minute; (iv) air heated to a temperature in a range of about 530 to about 680 deg. C. provided at an air flow rate of about 190 L/minute in a process speed of about 70 feet per minute; (v) air heated to a temperature in a range of about 530 to about 680 deg. C. provided at an air flow rate of about 195 L/minute in a process speed of about 70 feet per minute; or (vi) air heated to a temperature in a range of about 530 to about 680 deg. C. provided at an air flow rate of about 200 L/minute in a process speed of about 70 feet per minute.

Further non-limiting embodiments of process speeds, air flow rates, and heated air temperatures include: (i) air heated to a temperature of about 500 deg. C. provided at an air flow rate of about 120 L/minute for a process speed of about 45 feet per minute; (ii) air heated to a temperature of about 500 deg. C. provided at an air flow rate of about 180 L/minute for a process speed of about 45 feet per minute; (iii) air heated to about 500 deg. C. provided at an air flow rate of about 180 L/minute in a process speed of about 50 feet per minute; (iv) air heated to about 580 deg. C. provided at an air flow rate of about 200 L/minute for a process speed of about 70 feet per minute, (iv) air heated to 600 deg. C. provided at an air flow rate of about 180 L/minute in a process speed of about 70 feet per minute; (v) air heated to 600 deg. C. provided at an air flow rate of about 200 L/minute in a process speed of about 70 feet per minute; (vi) air heated to 620 deg. C. provided at an air flow rate of about 200 L/minute in a process speed of about 70 feet per minute;

or (vii) air heated to 640 deg. C. provided at an air flow rate of about 180 L/minute in a process speed of about 70 feet per minute.

The calibrated process speed, air flow rate, and temperature of the heated air can be adjusted independently from one another to optimize the welding function of the hot air nozzle 100 within the ranges disclosed for each in this application. The process speed, air flow rate, and temperature are generally directly related whereby higher air temperatures are used at faster process speeds and air flow rates, while conversely lower air temperatures are used at slower process speeds and air flow rates. Adjustments to the process speed, air flow rate, and temperature of the heated air can be made for any number of factors, such as, for example, the fusion temperature of the material that is being heat sealed, the physical characteristics (e.g., size, shape, thickness, etc.) of the material that is being heat sealed, and the characteristics of the desired weld (e.g., size, strength, location on material, etc.) that is being formed by the hot air nozzle 100. Such adjustments could be ascertained by a person of skill in the art.

Turning now to FIGS. 6-11, the hot air nozzle 100 can be used to improve heat sealing operations carried out by horizontal fill, fold and seal machines. A fill, fold and seal machine, such as those previously described in this application, provides sequential, continuous operations that fill pre-formed poly woven bags with content, such as, for example, dried pet food, and then heat seal the folded bag opening with or without thermoset adhesives applied along the desired location of the seal.

Machine operations for a horizontal fill, fold and seal machine generally include the following steps (1)-(4) from upstream to downstream of the process flow D:

(1) a bag 204 is opened and then filled with product from a hopper;

(2) the upper edges 210 of the opening of the filled bag 204 are aligned with one upper edge 210 extending vertically beyond the other upper edge 210, and then fed into sets of conveyor belts or rollers that maintain the upper edge alignment while the filled bag 204 is being transported horizontally to an in-feed of a folding mechanism 208;

(3) the aligned upper edges 210 of the bag are then passed horizontally along the inverted u-shaped folding mechanism 208 and over an inner guide rail 299 having a downstream end that terminates immediately upstream from the front or "leading" edge 112 of the blade 102 where: (a) the aligned upper edges 201 of the filled bag 204 are folded generally into a u-shape fold 200 along the length of the filled bag 204 (see FIGS. 7, 8A) so that the upper edges 210 overlap (see FIG. 8A), and (b) a hot air nozzle 100, which is positioned under and upstream from the downstream end of the folding mechanism 208 (e.g., rear or "trailing" edge 118 of the blade 102 of the hot air nozzle 100 does not align with or extend beyond the downstream end of the folding mechanism 208), directs hot air against corresponding interior surface of the u-shaped fold 200 passing by the hot air nozzle 100; and (4) the overlapping upper edges 210 that are folded and heated to a fusion temperature of the bag material, such as, for example, poly woven material (or a thermoset adhesive, if present, is heated to activation temperature) are then fed into sets of compression belts or rollers 218 adjacent to the downstream end of the folding mechanism 208 that press the folded portion of the filled bag 204 to promote contact of the heated portion of the bag 204 (or thermoset adhesive) for seal formation.

Figure 8B:
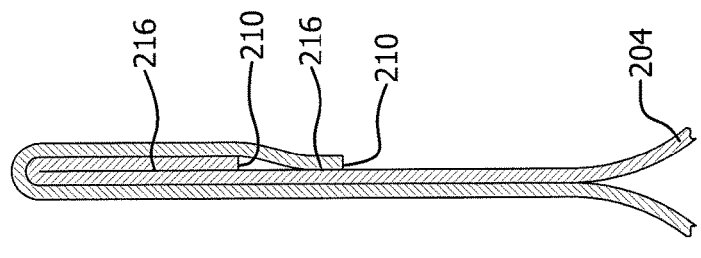
FIG. 8B shows a sectional view of the horizontal fill, fold and seal machine along line 8B also depicted in FIG. 7.
Figure 8A:
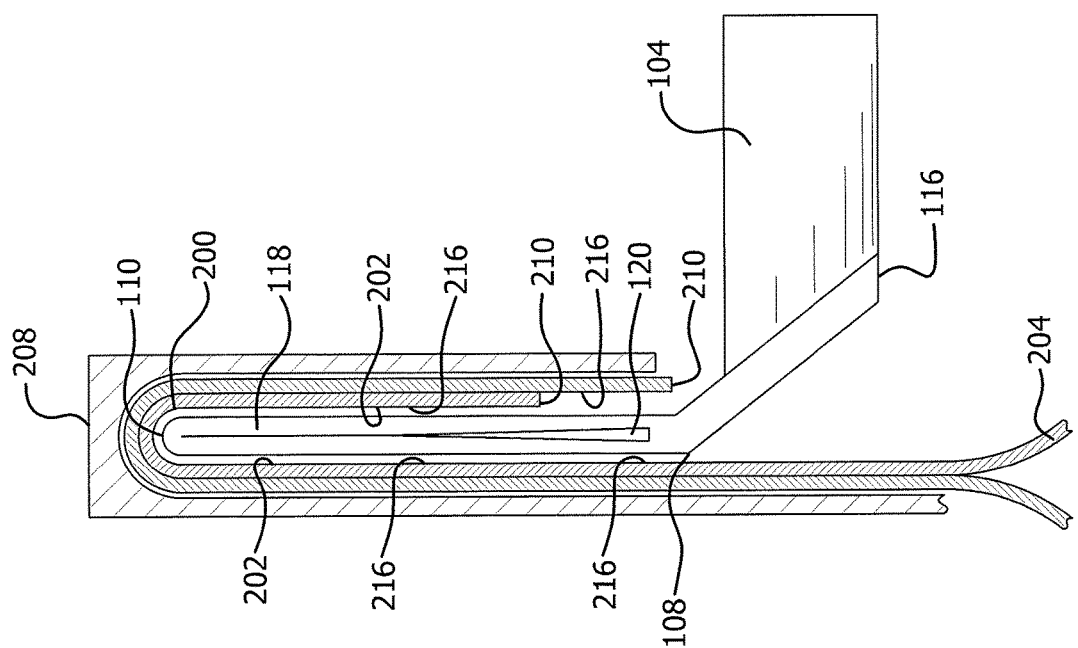
FIG. 8A shows a sectional view of the horizontal fill, fold and seal machine along line 8A depicted in FIG. 7.

The seal can be formed along the lower one-third of the u-shaped fold 200 in a sealed bag (see FIG. 8B) predominantly where the upper edges 210 are overlapped as shown in FIG. 8B. Alternatively, the seal can be formed along more than the lower one third of the u-shaped fold 200 in alternative applications for a stronger seal or seam.

A cooling operation may be included downstream from or in conjunction with the compression roller operation to promote seal formation of the heated portion of the bag 204 or bonding of a thermoset adhesive where applied to the u-shaped fold 200. For example, a cold air gun or cooler (Vortec 630) can be used to direct an airflow of cooled air, which may be generated by vortexing compressed air (e.g., about 80-100 psig) in a vortex chamber, onto the rollers used to compress the material downstream from the hot air nozzle 100. The cold air gun may have a cooling capacity of up to 2,500 BTU or more per hour.

Referring now to FIGS. 6-8B, the hot air nozzle 100 is connected to a hot air tool 205 of a horizontal fill, fold, and seal machine. The hot air tool 205 flows heated air to the hot air nozzle 100 at a preset flow rate that can be constant or intermittent. A significant portion of the blade 102 of the hot air nozzle 100 is positioned underneath a downstream portion of the inverted u-shaped folding mechanism 208, but the rear or "trailing" edge 118 of the blade 102 of the hot air nozzle 100 does not align with or extend past the downstream end of the inverted u-shaped folding mechanism 208 as is shown in FIGS. 6 and 7. More specifically, the hot air nozzle 100 is positioned under a downstream portion of the inverted u-shaped folding mechanism 208, with a gap provided between the blade 102 of the hot air nozzle and the inner surface of the folding mechanism 208. This positioning of the hot air nozzle is also where the upper edges 210 of the bag 204 are formed into a u-shape fold 200 with the upper edges 210 overlapping, as illustrated in FIG. 8A, while the bag 204 passes in downstream direction D in the process flow of the operation.

The hot air nozzle 100 may be fixed at a sealing position in a sealing operation. The sealing position is where the blade 102 of the hot air nozzle 100 is positioned under the inverted u-shaped folding mechanism 208 at a location that is upstream from the downstream end of the folding mechanism 208 and where the rear or "trailing" edge 118 of the blade of the hot air nozzle 100 does not align with or extend beyond the downstream of the folding mechanism 208 and with sufficient space between the inner surface of the folding mechanism and the blade 102 of the hot air nozzle 100 that permits the u-shaped fold 200 to pass by the hot air nozzle 100 without the nozzle 100 contacting the material forming the u-shaped fold 200. The hot air nozzle 100 may also be attached to a dynamic mechanism configured to move the hot air nozzle 100 from a sealing position—where it directs heated air to weld a material—to a retracted position remote from the sealing position. For example, a mechanism may be used to pivot the hot air nozzle 100 away from a sealing position (see FIG. 11) under the folding mechanism 208 to a location remote from the sealing operation (see FIG. 10).

In another embodiment, the hot air nozzle 100 may be configured with a mechanism that lowers the hot air nozzle 100 down from a sealing position under the folding mechanism 208 and then rotates or swings the lowered hot air nozzle 100 away from the folding mechanism 208. A purpose of the dynamic mechanism is to articulate the hot air nozzle 100 between (i) the sealing position when a process run of bags 204 are passed over the nozzle to be welded, and (ii) the remote location when no bags 204 are being passing over the nozzle 100. Movement of the hot air nozzle 100 from the sealing position to the remote position can be controlled by sensors that collect information about when a bag is approaching the nozzle 100 and when the bag has passed the nozzle 100.

Referring to FIGS. 6 and 7, the hot air nozzle 100 discharges an airstream pattern 132 of hot air through the hot air slit 120 of the trailing edge 118 of the blade 102 in a downstream direction D from the blade 102 of hot air nozzle 100. This downstream discharge of hot air is relative to the downstream movement of the bag 204 in a heat sealing operation. The leading end 212 of the u-shaped upper edge 210 of the bag 204 (see FIG. 7), followed by the rest of the u-shaped fold 200, passes over the blade 102 from the leading end 212 to the trailing end 214 of bag 204.

In a non-limiting embodiment, the process speed of a heat sealing operation for a fill, fold, and seal machine is calibrated with the temperature of the heated air provided by the hot air tool 206 to the hot air nozzle 100, as well as the air flow rate of the heated air by the hot air tool 206. In an example, the process speed for a fill, fold, and seal machine will be set so that the u-shaped upper edge 210 of each bag 204 is passed over the hot air nozzle 100 at a process speed in a range of about 40 to about 80 feet per minute. For example, the fill, fold, and seal operation with a slower process speed (e.g., about 50 feet per minute) may direct air against the material to be sealed at a lower temperature (e.g., about 500 deg. C.). Conversely, a faster process speed (e.g., about 70 feet per minute) may direct air against the material to be sealed at a higher temperature (e.g., about 600 deg. C.).

During a heat sealing process, the u-shaped fold 200 in the inverted u-shaped folding mechanism 208 passes by the rear or "trailing" edge 118 of the blade 102 interposed in the u-shaped fold 200. As this movement of the bag 204 occurs, the heated air is evenly and consistently discharged through the opening 120 in an airstream pattern 132 parallel to the direction of travel of the u-shaped fold 200 of bag 204 in process flow D. The airstream pattern 132 creates an air envelope around the hot air nozzle 100 and contacts the inner sides 216 of the u-shaped fold 200 of the bag 204 to heat precise regions of the surface of the inner sides 216 of the bag 204 material to a fusion temperature. The melted inner sides 216 will be later fused or bonded together downstream from the hot air nozzle 100 when pressure applied by rollers 218 or other devices set the seal with the overlapping upper edges 210 as shown in FIG. 8B. The lower edge of the seal will start where the overlapping upper edges 210 are sealed to the bag 204 and the width of the seal will extend about ⅓ or more of the distance from the lower edge to the top of the u-shaped fold 208. If a thermoset adhesive has been applied to the inner sides 216 of the u-shaped fold 200 of the bag 204, the airstream pattern 132 of hot air discharged along the surface of the thermoset adhesive activates the adhesive to bond the inner sides 216 of the bag material when pressure is applied to the u-shaped fold 200 downstream from the hot air nozzle 100 to set the seal.

The pull strength of a seam or seal formed by the hot air nozzle 100 of the present invention is stronger and more consistent along the length of the seal when compared to seals formed by prior art nozzles. For example, tests comparing seal strength of poly woven material sealed with a fill, fold, and seal operation by the hot air nozzle 100, as well as a prior art nozzle comprising a plurality of holes, was evaluated by the Standard Test Method for Seal Strength of Flexible Barrier Materials (ASTM F88/F88M-09). The test sought to determine the consistency of the pull strength of a seal formed with the poly woven material, as well as the mode and location of the failure of the seal and/or material, e.g., seal break, material break, or combination of both. During the test, measurable force was exerted along the seam or seal and then the force necessary to break the seal or seam was determined.

The nature of the seal break was identified and recorded. The seal break was identified as "TF" if a fiber break of the outer poly woven material occurred above the seal surface at the top of the seal. If the fiber break of the outer poly woven material occurred at a distance from the top of the seal, not directly above the welded area, then the distance was measured in inches from the top of the seal to the fiber break. The seal break was identified as "S" if the break was a seal break. It was also determined whether the seal break occurred at the situs of the bond or the outer poly woven material. The seal break was recorded as "BF" if a fiber break of the outer poly woven material occurred above the seal surface at the bottom of the seal. If the fiber break occurred at a distance from the bottom of the seal, not directly above the welded area, then the distance was measured in inches from the bottom of the seal to the fiber break. A break was identified as "F" if the fiber of the poly woven material broke. The test also measured the pull force necessary to break poly woven material used in the test.

Testing was carried out using a Mark 10 tensile testing machine. Samples were collected from poly woven bags that were heat sealed with fill, fold and seal machines. The poly woven material used for testing of prior art nozzle and hot air nozzle 100 was the same. It comprised a triple-layer, laminated material with the follow characteristics: the inner layer was woven polypropylene (PP; CACO3; colorants—white; warp/weft: 7.7 per inch×7.7 per inch; fabric weight 74 gsm-2.2 oz/syd); the middle layer was polypropylene laminate (PP; PE; laminate weight 0.78 oz/syd); and the outer layer was biaxially-oriented polypropylene film (70 gauge; 0.47 oz/syd). Seals were formed with the poly woven material using a horizontal fill, fold and seal machine. The process flow speed of the fill, fold and seal machine was 70 feet per minute for all samples. The air flow rate was 120 L per minute for all samples. The temperature of the heated air passed through the nozzle is disclosed for the test samples sample in Table 1. Compression rollers downstream from the nozzle were set to compress the heat sealed end of the material at 5 bar. A cold air gun (Vortec No. 630) directed cooled air, which was generated by vortexing filtered, compressed air (85 psi), onto the rollers at a rate of about 25 scfm during the heat sealing process for all samples.

The prior art nozzle used in testing had 12 holes individually and linearly spaced vertically on the trailing end of that nozzle. The lowest 5 holes had a diameter of about 0.047 inches, the middle 5 holes had a diameter of about 0.044 inches, and the upper 2 holes had a diameter of about 0.042 inches. By comparison, the hot air nozzle 100 used during testing had an opening 120 with the rectangular profile shown in FIGS. 17 and 20.

About 5-10 minutes after the sample material was heat sealed and compressed by compression rollers, test samples of material were cut perpendicular to the top fold of each sealed bag and seal, at a width of about one inch and at a length of about 4-5 inches from the top fold. Consequently, each test sample comprised one inch wide portions of the fold of the bag, the seal, and two overlapping unsealed portions of the bag 204. Each test sample was sealed at one end with two unsealed layers of material at the other end.

The unsealed layers extended about 2 inches from the bottom of the seal of each test sample.

Testing involved separating the ends of the unsealed layers of a test sample and clamping each end in opposing compression grips of a Mark 10 with the sample centered laterally between the grips. The seal of each test sample was, but was not required to be, positioned about equidistant from the opposing compression grips of the Mark 10. The seal line (top and bottom edge of the seal) was generally perpendicular to the direction of pull force exerted by the compression grips. The seal remained unsupported while the test was initiated and conducted. The initial grip separation distance was about 6 inches. A force gauge was set with units in pound force per inch (lbF), mode at peak tension (PT), and initial force set at 0. The test stand was set at a rate of separation of the grips of 12 inches per minute. Testing ran until the sample stressed to failure at which point the test was stopped. The maximum force (lbF) was recorded. The grips were returned to the starting position, then the sample was removed for visual inspection to determine the type of break according to the failure modes described in ASTM F88/F88M-09 as described above.

embodiment, the hot air nozzle 100 is capable of creating a seal having seal strength consistently no less than 70 pounds force per inch (lbF) across the face of the seal. In alternative embodiments, the hot air nozzle 100 is capable of creating a seal having a consistent seal strength across the face of the seal within a range of about 70-100% of the pull strength of the material, e.g., poly woven material, used to manufacture the bag.

Figure 14:
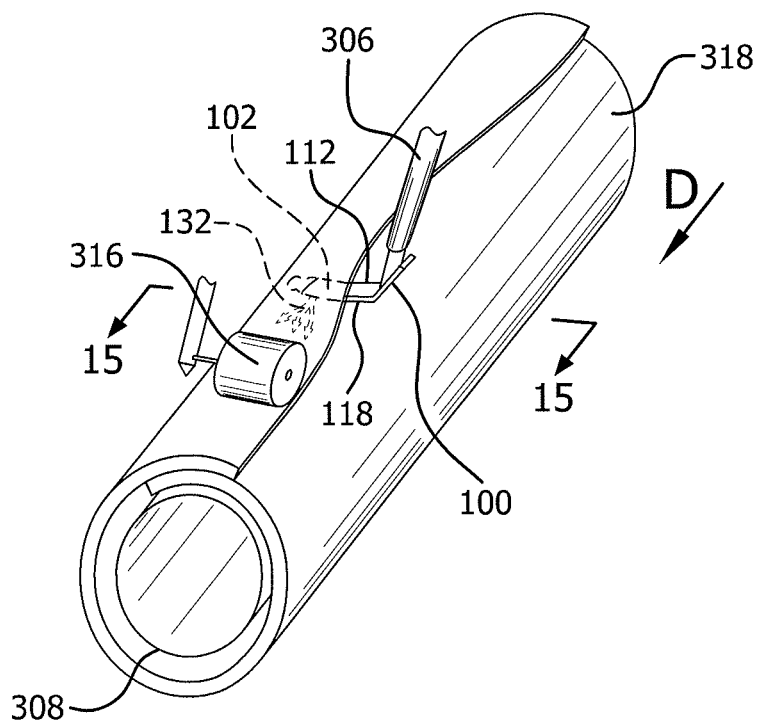
FIG. 14 shows a perspective view of a nozzle of the invention being used to form a lap seam along opposing edges of a thermoplastic sheet to form tube stock.
Figure 15:
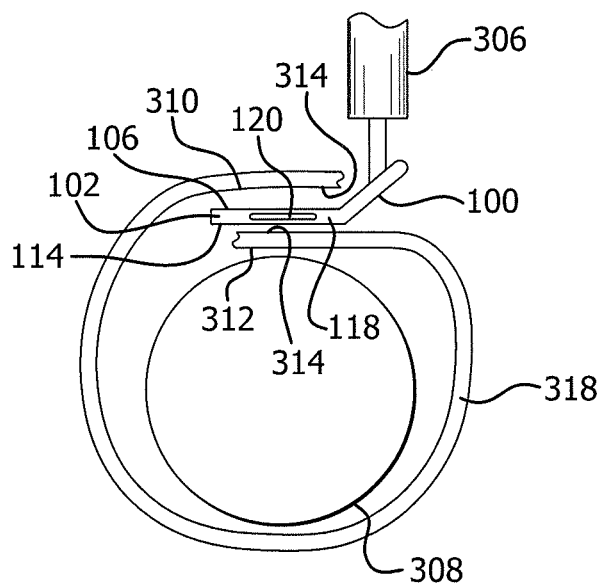
FIG. 15 shows a cross sectional view along line 15 depicted in FIG. 14.

The hot air nozzle 100 can also be used to improve heat sealing operations carried out by a vertical form, fill and seal machine shown, for example, in FIGS. 14 and 15. A vertical form, fill and seal machine carries out sequential, continuous processing steps to form tube stock from a roll of flat plastic film, paper, or fabric material and then bags from the tube stock. If paper or fabric material is being used to from tube stock and bags, then a thermoset adhesive is applied at the point of the seam or seal prior to heat sealing.

Referring again to FIGS. 14 and 15, the processing operations performed by a vertical form, fill and seal machine with the hot air nozzle 100 generally include the following steps (1)-(4):

TABLE 1

Seal Strength Test Comparison

| Break Force (lbF) (Location of Break, e.g., BF, TF, S, or F, with any Distance of Fiber Break from the Seal in inches) | | | | Temp. (deg. C.) of air applied by nozzle during heat sealing | Run Ref. # |
|---|---|---|---|---|---|
| Left End of Seal | Left Center of Seal | Right Center of Seal | Right End of Seal | | |
| PRIOR ART NOZZLE | | | | | |
| 88.8 (1¾" TF) | 62.9 (TF) | 61.0 (TF) | 73.4 (1¼" TF) | 665 | 159 |
| 89.5 (BF) | 69.4 (TF) | 54.9 (TF) | 86.1 (BF) | 640 | 133 |
| 98.7 (1" BF) | 55.7 (TF) | 59.4 (TF) | 85.8 (TF) | 630 | 124 |
| 94.9 (1¾" BF) | 70.0 (TF) | 62.3 (TF) | 98.2 (TF) | 625 | 177 |
| 80.2 (BF) | 73.4 (S) | 61.7 (BF) | 69.8 (S) | 620 | 119 |
| 94.8 (BF) | 65.5 (S) | 69.6 (S) | 91.8 (BF) | 600 | 173 |
| 103.6 (F) | 67.9 (F) | 59.7 (F) | 90.0 (F) | 580 | 58 |
| 97.3 (BF) | 77.0 (TF) | 61.6 (TF) | 71.5 (TF) | 575 | 130 |
| 96.5 (F) | 59.8 (F) | 66.8 (F) | 91.1 (F) | 560 | 61 |
| HOT AIR NOZZLE OF PRESENT INVENTION | | | | | |
| 93.8 (BF) | 88.5 (TF) | 91.8 (¾" TF) | 90.9 (2" BF) | 680 | 784 |
| 90.9 (BF) | 92.3 (½" TF) | 92.5 (1" TF) | 91.0 (BF) | 650 | 785 |
| 98.4 (2" BF) | 95.2 (½" TF) | 90.02 (BF) | 88.9 (¾" BF) | 640 | 640 |
| 93.6 (1¼" BF) | 72.9 (¾" TF) | 80.2 (½" TF) | 105.0 (1¼" BF) | 630 | 607 |
| 90.1 (1.65" BF) | 96.2 (BF) | 98.7 (½" TF) | 103.7 (BF) | 620 | 609 |
| 82.8 (BF) | 89.6 (TF) | 78.6 (TF) | 89.5 (BF) | 600 | 510 |
| 91.8 (BF) | 88.8 (½" TF) | 74.8 (BF) | 93.6 (BF) | 590 | 383 |
| 100.7 (BF) | 97.0 (2" BF) | 86.5 (TF) | 93.5 (BF) | 580 | 374 |
| 79.8 (BF) | 78.6 (TF) | 74.0 (TF) | 92.7 (¼" BF) | 570 | 371 |
| 82.1 (BF) | 77.6 (S) | 89.4 (3½" TF) | 103.4 (2" BF) | 560 | 368 |
| 93.8 (BF) | 81.6 (3" BF) | 86.4 (BF) | 96.0 (BF) | 550 | 362 |
| 100.6 (2½" BF) | 80.2 (BF) | 82.5 (¼" BF) | 90.5 (2½" BF) | 540 | 358 |
| 93.1 (BF) | 86.1 (TF) | 93.1 (BF) | 88.0 (BF) | 530 | 355 |

Table 1 shows that the hot air nozzle 100 of the present invention provided a consistent seal strength above 70 pounds force per inch across the face of a seal. The seal strength consistency occurred within the range of the temperatures of the heated air provided on Table 1. In contrast, the prior art nozzle created seals having inconsistent seal strength, and in many instances, below 70 pounds force per inch, across the face of the seal. Seal strength inconsistency occurred within the range of the temperatures of the heated air provided on Table 1.

The hot air nozzle 100 can be used form a seal with a consistent seal strength across the face of the seal, e.g., the ends and entire region of the seal between the ends. In an (1) the plastic film material 318 is advanced onto and wrapped around a long tube (also referred to as the forming tube 308);
(2) the outer edges of the plastic film 318 are positioned so that an upper edge 310 overlaps with a lower edge 312 at an amount sufficient to create a facing surface 314 along the length of the plastic film material 318 that will be formed into a tube;
(3) a heat sealing operation using a hot air nozzle 100 or other heat applicator bonds the overlapping upper edge 310 and lower edge 312 by either: (a) heating the plastic film material 318 along a path on the facing surfaces 314 of overlapping edges 310, 312 to a fusion temperature, or alternatively, (b) activating a thermoset adhesive applied along a path on the facing surfaces 314 of edges 310, 312 where the lap seam will be formed; and then (4) applying compression force so that the heated, facing surfaces 314 of edges 310, 312 contact one another to form the lap seam.

Referring again to FIGS. 14 and 15, the hot air nozzle 100 connected to a hot air tool 306 provides sufficiently heated air to the hot air nozzle 100 positioned adjacent to the forming tube 308. FIGS. 14 and 15 also show that the upper edge 310 passes the side surface 106 of the blade 102 of the hot air nozzle 100 and the lower edge 312 of the material passes the side surface 114 of the blade 102 during heat sealing.

FIG. 14 shows that, as the material passes the blade 102 from the front or "leading" edge 112 to the rear or "trailing" edge 118, the opening 120 directs hot air in a symmetric and uniform airstream pattern 132 downstream in the process flow D from the hot air nozzle 100, which is parallel to the direction of travel of the material relative to the blade 102. An airstream pattern 132 of hot air is evenly and consistently directed through the opening 120 precisely along a path on the facing surfaces 314 of the overlapping upper edge 310 and lower edge 312 of the material passing by the hot air nozzle 100. This heats the overlapping inner surfaces 314 of the material to a fusion temperature (if thermoplastic, elastomeric, or similar "meltable" material) so that the inner surfaces 314 can be later compressed together downstream from the hot air nozzle 100 with pressure applied by a roller 316 or similar device that sets the seal. If a thermoset adhesive has been applied to the inner surface(s) 314 of the material, the air stream pattern 132 of hot air can be directed along the surface of the thermoset adhesive thereby activating it to bond the inner surfaces 314 of the material together when pressure is applied to set the seal.

After the plastic film is formed into a tube, the bagging process begins. This process includes applying a horizontal sealing bar clamp across a bottom edge of the tube. The sealing bar bonds the film together at a seam and cuts off any film below the seam. Product to be bagged is then dispensed into the bag until a fill weight is reached, then the horizontal sealing bar seals the top of the bag and simultaneously forms the bottom of the next bag to be formed and filled from the tube. The sealed bag is then cut off from the tube.

Figure 12:
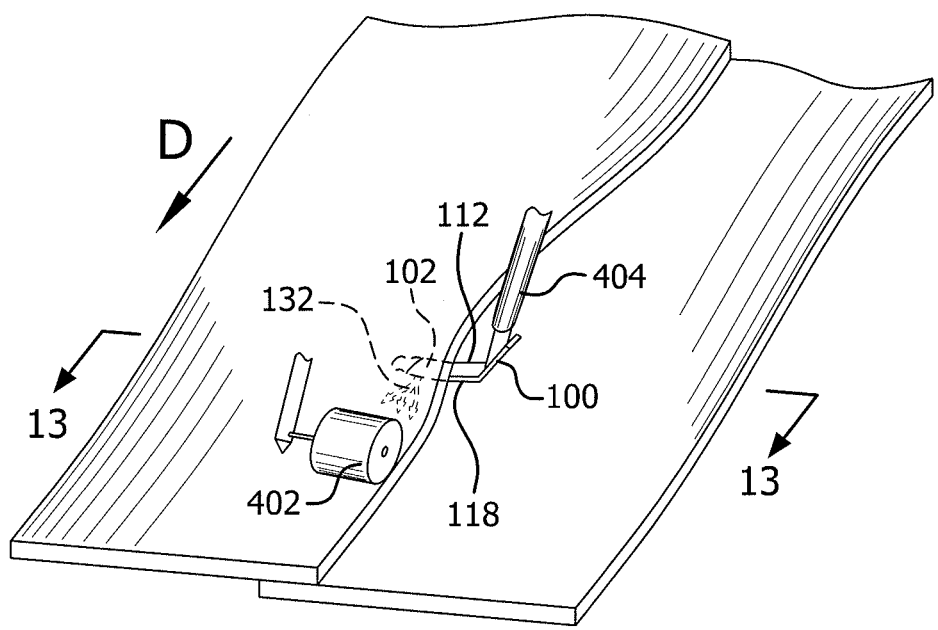
FIG. 12 shows a perspective view of a nozzle of the invention being used to form a lap seam that joins pieces of thermoplastic sheet material.
Figure 13:
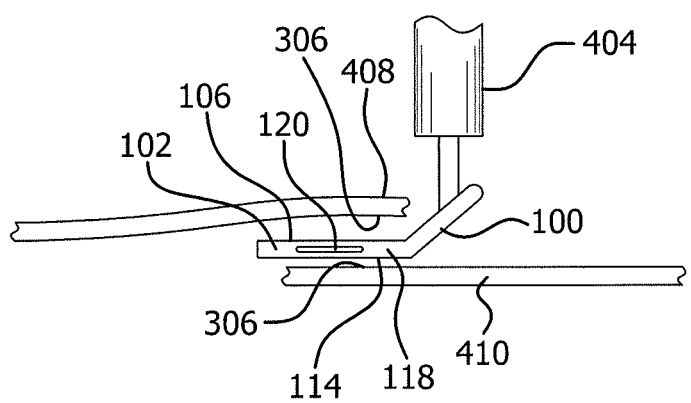
FIG. 13 shows a cross sectional view along Line 13 depicted in FIG. 12.

Referring now to FIGS. 12 and 13, the hot air nozzle 100 has further use to improve heat sealing operations for a seam sealer machine. A typical seam sealer machine aligns overlapping pieces of thermoplastic or other material and welds a lap seam along the facing surfaces of the overlap. The lap seam can be formed by heat sealing with heated air that heats some or all of the facing surfaces of the overlapping pieces to a fusion temperature, or, alternatively, the hot air heats a thermoset adhesive, along the region of the seal. Compression force is then applied by a roller 402 or similar device that presses the overlapping material into contact with one another to set the seal.

Referring again to FIGS. 12 and 13, the hot air nozzle 100 is connected to a hot air tool 404 that provides heated air to the nozzle 100. The hot air nozzle 100 can be positioned adjacent to a forming support of the heat sealer machine. The hot air nozzle 100 is positioned with the heat sealer machine so that the upper piece 408 of material passes the side surface 106 of the blade 102 of the hot air nozzle 100 and the lower piece 410 of material passes the side surface 114 of the blade 102 of the hot air nozzle 100. As the pieces of material pass the blade 102 from the front or "leading" edge 112 to the rear or "trailing" edge 118, the opening 120 directs an airstream of heated air downstream in the process flow D from the hot air nozzle 100 and parallel to the direction of travel of the pieces of material relative to the blade 102.

Airstream pattern 132 of heated air is evenly and consistently discharged through the opening 120 parallel to the downstream direction D of travel of the material in the process, and along a precise portion of the facing inner surfaces 306 of the overlapping pieces of material passing by the hot air nozzle 100. This heats the facing inner surfaces 306 of the pieces of material to a fusion temperature (if thermoplastic, elastomeric, or the like) so that the inner surface 306 can be later bonded together downstream from the hot air nozzle 100 with pressure applied by rollers 402 or similar device used to compress the overlapping material together to set the seal. If a thermoset adhesive has been applied to the inner surface(s) 306 of the pieces of material, the airstream pattern 132 of hot air can be directed along the surface of the thermoset adhesive thereby activating it to bond the inner surfaces 306 of the pieces of material when pressure is applied to set the seal.

In alternative applications, the seam sealer machine configured with the hot air nozzle 100 can be used to form lap seals in rolls of flat plastic film to produce tube stock in the same or similar manner disclosed herein, with a form, fill, and seal machine. In further embodiments, the seam sealer machine configured with the hot air nozzle 100 can be used to weld single-folded or double-folded edge seals along an edge of thermoplastic or other material.

While the invention has been described above in conjunction with specific embodiments, many alternatives, modifications, permutations, and variations will become apparent to those skilled in the art in light of the foregoing description. Accordingly, it is intended that the present invention embraces all such alternatives, modifications, and variations as falling within the scope of the claims below.

What is claimed is:

1. A bag sealing apparatus comprising:
a folding mechanism configured to form a fold along an open end of a bag when said bag is passed downstream along said folding mechanism;
a nozzle provided under said folding mechanism with a gap between said nozzle and said folding mechanism, at a location where said nozzle does not extend beyond a downstream end of said folding mechanism and where said folding mechanism is configured to form said fold in said bag, said nozzle comprising:
a blade having a leading edge and a trailing edge with an opening in communication with an internal channel configured to receive heated air flowing from an air heating tool, wherein said blade is positioned relative to said folding mechanism to be interposed within said fold of said bag passing downstream through said folding mechanism, and wherein said opening is configured to direct a uniform airstream of hot air downstream from and perpendicular to said trailing edge of said nozzle, and thereby to prevent contact between said blade and said fold; and
opposing rollers configured to compress said fold between said opposing rollers downstream from said folding mechanism.

2. The apparatus of claim 1 wherein said opening is defined by at least one linear edge, one or more elliptical edges, or a combination of at least one linear edge and one or more elliptical edges.

3. The apparatus of claim 1 wherein said opening comprises one of the following profiles: a triangle, a quadrilateral, a diamond, a rhombus, a rectangle, a single step or double step, a taper, or a banjo shape.

4. The apparatus of claim 1 wherein said nozzle comprises any one or more of metal, metal alloy, or ceramic.

5. The apparatus of claim 1 wherein said nozzle is configured to pivot between a welding position under said folding mechanism and a retracted position that is remote from said folding mechanism.

6. The apparatus of claim 1 wherein said nozzle is configured to vertically drop down and swing away from said folding mechanism.

7. The apparatus of claim 1 wherein said air heating tool provides said heated air to said nozzle at a temperature in a range of about 100 degrees C. to about 950 degrees C.

8. The apparatus of claim 1 wherein said air heating tool flows said heated air at a flow rate in a range of about 60 liters per minute to about 250 liters per minute.

9. The apparatus of claim 1 wherein said apparatus passes said bag downstream along said folding mechanism at a rate in a range of about 40 feet per minute to about 80 feet per minute.

10. An apparatus for forming a seam with a material comprising:
a nozzle comprising a blade having a leading edge and a trailing edge with an opening in communication with an internal chamber configured to receive heated air flowing from an air heating tool, and
opposing rollers configured to compress between said opposing rollers an upper edge of said material overlapping with a lower edge of said material, said opposing rollers are downstream from said nozzle;
wherein said apparatus is configured to interpose said blade between said upper edge of said material overlapping with said lower edge of said material while said material is passed by said blade, and
wherein said opening is configured to direct a uniform airstream of heated air in a direction downstream from said trailing edge of said nozzle at a temperature sufficient to heat opposing inner surfaces of said upper edge and said lower edge to a fusion temperature, whereby said uniform airstream is configured to provide an envelope around said nozzle to prevent contact between said nozzle and said inner surfaces.

11. The apparatus of claim 10 wherein said opening is defined by at least one linear edge, one or more curvilinear edges, or a combination of at least one linear edge and one or more curvilinear edges.

12. The apparatus of claim 10 wherein said opening comprises one of the following profiles: a triangle, a quadrilateral, a diamond, a rhombus, a rectangle, a single step, double step, a taper, or a banjo shape.

13. The apparatus of claim 10 wherein said nozzle comprises any one or more of metal, metal alloy, or ceramic.

14. The apparatus of claim 10 wherein said airstream is directed parallel to downstream movement of said upper edge and said lower edge relative to said nozzle.

15. The apparatus of claim 10 wherein said heated air is provided at a temperature from about 100 degrees C. to about 950 degrees C.

16. A plastic welding system comprising:
a folding device configured to create a fold along a top section of a bag as said bag moves in a downstream direction along said folding device;
a downstream end of said folding device; and
a welding nozzle under a downstream end of said folding device and not extending beyond said downstream end thereof, wherein said welding nozzle is configured to heat a portion of said fold of said bag to a fusion temperature without contact with said bag; and
compression rollers downstream from said downstream end of said folding device, said compression rollers configured to compress said fold of said bag between said compression rollers.

17. The plastic welding system of claim 16 wherein said bag comprises a thermoplastic, an elastomeric, a paper, or a woven material.

18. The plastic welding system of claim 17 further comprising a thermoset adhesive provided on inner side surfaces of said fold.

19. The plastic welding system of claim 16 wherein said nozzle comprises an opening through a trailing edge.

20. The plastic welding system of claim 19 wherein said opening comprises one of the following profiles: a triangle, a quadrilateral, a diamond, a rhombus, a rectangle, single step, double step, a taper, or a banjo shape.

21. The plastic welding system of claim 19 wherein said opening is defined by at least one linear edge, at least one curvilinear edge, or a combination of at least one linear edge and at least one curvilinear edge.

22. The plastic welding system of claim 16 wherein said opening forms a symmetric airstream when heated air is flowed through said nozzle.

23. The plastic welding system of claim 22 wherein said airstream flows parallel to a process flow of said fold of said bag relative to said folding device.

24. The plastic welding system of claim 22 wherein said heated air is provided at a temperature in a range of about 100 degrees C. to about 950 degrees C.

25. The plastic welding system of claim 22 wherein said heated air flows through said nozzle at a flow rate in a range of about 60 liters per minute to about 250 liters per minute.

26. The plastic welding system of claim 16 wherein said nozzle is configured to pivot between a welding position under said folding device and a retracted position that is remote from said folding device.

27. The plastic welding system of claim 16 wherein said nozzle is configured to vertically drop down and/or swing away from said folding device.

28. The plastic welding system of claim 16 wherein said bag moves in a downstream direction along said folding device at a rate in a range of about 40 feet per minute to about 80 feet per minute.

29. The plastic welding system of claim 16 wherein said nozzle comprises any one or more of metal, metal alloy, or ceramic.

* * * * *